United States Patent
Sharma et al.

(10) Patent No.: US 9,400,943 B2
(45) Date of Patent: Jul. 26, 2016

(54) IDENTIFYING IOT DEVICES/OBJECTS/PEOPLE USING OUT-OF-BAND SIGNALING/METADATA IN CONJUNCTION WITH OPTICAL IMAGES

(71) Applicant: QUALCOMM Incorporated, San Diego, CA (US)

(72) Inventors: Sandeep Sharma, San Diego, CA (US); Amit Goel, San Diego, CA (US); Mohammed Ataur Rahman Shuman, San Diego, CA (US); Nivedita Sarkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 14/448,880

(22) Filed: Jul. 31, 2014

(65) Prior Publication Data

US 2015/0036881 A1    Feb. 5, 2015

Related U.S. Application Data

(60) Provisional application No. 61/861,609, filed on Aug. 2, 2013, provisional application No. 61/904,370, filed on Nov. 14, 2013.

(51) Int. Cl.
*G06K 9/00* (2006.01)
*G06K 9/62* (2006.01)
*H04W 4/00* (2009.01)
(Continued)

(52) U.S. Cl.
CPC ........ *G06K 9/6217* (2013.01); *G06F 17/30244* (2013.01); *G06K 9/00624* (2013.01); *G06K 9/6227* (2013.01); *G06K 9/6267* (2013.01); *H04W 4/005* (2013.01); *H04W 4/043* (2013.01); *H04W 4/185* (2013.01);
(Continued)

(58) Field of Classification Search
USPC ....................................................... 382/103
See application file for complete search history.

(56) References Cited

U.S. PATENT DOCUMENTS 6,081,230 A * 6/2000 Hoshino .............. G01C 21/165
                                                          342/357.32
8,422,994 B2 * 4/2013 Rhoads .................. G01C 21/20
                                                          455/411
(Continued)

FOREIGN PATENT DOCUMENTS

EP    2293531 A1    3/2011
WO    2012107517 A1    8/2012

OTHER PUBLICATIONS

International Search Report and Written Opinion—PCT/US2014/049405—ISA/EPO—Oct. 1, 2014.
(Continued)

*Primary Examiner* — John Strege
(74) *Attorney, Agent, or Firm* — Muncy, Geissler, Olds & Lowe, P.C.

(57) ABSTRACT

The disclosure relates to identifying an object associated with a nearby Internet of Things (IoT) device. In an aspect, a device receives identifying information associated with the nearby IoT device, detects a nearby object in a field of view of a camera application, determines whether or not the nearby object is associated with the nearby IoT device based on the received identifying information, and based on the nearby object being associated with the nearby IoT device, determines that the nearby object corresponds to the object associated with the nearby IoT device.

80 Claims, 20 Drawing Sheets

(51) Int. Cl.
*H04W 4/04* (2009.01)
*H04W 4/18* (2009.01)
*G06F 17/30* (2006.01)
*H04W 4/02* (2009.01)

(52) U.S. Cl.
CPC .......... *G06K 2209/27* (2013.01); *H04W 4/008* (2013.01); *H04W 4/021* (2013.01)

(56) References Cited

U.S. PATENT DOCUMENTS

| | | |
|---|---|---|
| 2008/0194270 A1 | 8/2008 | Greenberg |
| 2010/0149305 A1 | 6/2010 | Catchpole et al. |
| 2011/0115612 A1 | 5/2011 | Kulinets et al. |
| 2012/0293307 A1* | 11/2012 | Djuric ................ G06K 7/10465 340/10.2 |
| 2013/0110806 A1 | 5/2013 | Cai et al. |
| 2013/0223279 A1 | 8/2013 | Tinnakornsrisuphap et al. |
| 2013/0258117 A1 | 10/2013 | Penov et al. |
| 2013/0329006 A1 | 12/2013 | Boles et al. |
| 2015/0181200 A1* | 6/2015 | Arrasvuori ................ G06K 9/00 348/46 |

OTHER PUBLICATIONS

Kang J., "A Framework for Mobile Object Recognition of Internet of Things Devices and Inference with Contexts," Journal of Industrial and Intelligent Information, Mar. 2014, vol. 2 (1), pp. 51-55.

* cited by examiner

IDENTIFYING IOT DEVICES/OBJECTS/PEOPLE USING OUT-OF-BAND SIGNALING/METADATA IN CONJUNCTION WITH OPTICAL IMAGES

CROSS-REFERENCE TO RELATED APPLICATIONS

The present application for patent claims the benefit of U.S. Provisional Application No. 61/861,609, entitled "IDENTIFYING IOT DEVICES/OBJECTS/PEOPLE USING OUT-OF-BAND SIGNALING/METADATA IN CONJUNCTION WITH OPTICAL IMAGES," filed Aug. 2, 2013, and U.S. Provisional Application No. 61/904,370, entitled "IDENTIFYING IOT DEVICES/OBJECTS/ PEOPLE USING OUT-OF-BAND SIGNALING/METADATA IN CONJUNCTION WITH OPTICAL IMAGES," filed Nov. 14, 2013, assigned to the assignee hereof, and expressly incorporated herein by reference in its entirety.

BACKGROUND

1. Field of the Disclosure

The disclosure is directed to identifying Internet of Things (IoT) devices/objects/people using out-of-band signaling/ metadata in conjunction with optical images.

2. Description of the Related Art

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

The following presents a simplified summary relating to one or more aspects and/or embodiments associated with the mechanisms disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

According to one exemplary aspect, the disclosure relates to identifying an object associated with a nearby IoT device. A method for identifying an object associated with a nearby IoT device includes receiving identifying information associated with the nearby IoT device, detecting a nearby object in a field of view of a camera application, determining whether or not the nearby object is associated with the nearby IoT device based on the received identifying information, and based on the nearby object being associated with the nearby IoT device, determining that the nearby object corresponds to the object associated with the nearby IoT device.

An apparatus for identifying an object associated with a nearby IoT device includes logic configured to receive identifying information associated with the nearby IoT device, logic configured to detect a nearby object in a field of view of a camera application, logic configured to determine whether or not the nearby object is associated with the nearby IoT device based on the received identifying information, and logic configured to determine that the nearby object corresponds to the object associated with the nearby IoT device based on the nearby object being associated with the nearby IoT device.

An apparatus for identifying an object associated with a nearby IoT device includes means for receiving identifying information associated with the nearby IoT device, means for detecting a nearby object in a field of view of a camera application, means for determining whether or not the nearby object is associated with the nearby IoT device based on the received identifying information, and means for determining that the nearby object corresponds to the object associated with the nearby IoT device based on the nearby object being associated with the nearby IoT device.

A non-transitory computer-readable medium for identifying an object associated with a nearby IoT device includes at least one instruction to receive identifying information associated with the nearby IoT device, at least one instruction to detect a nearby object in a field of view of a camera application, at least one instruction to determine whether or not the nearby object is associated with the nearby IoT device based on the received identifying information, and at least one instruction to determine that the nearby object corresponds to the object associated with the nearby IoT device based on the nearby object being associated with the nearby IoT device.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
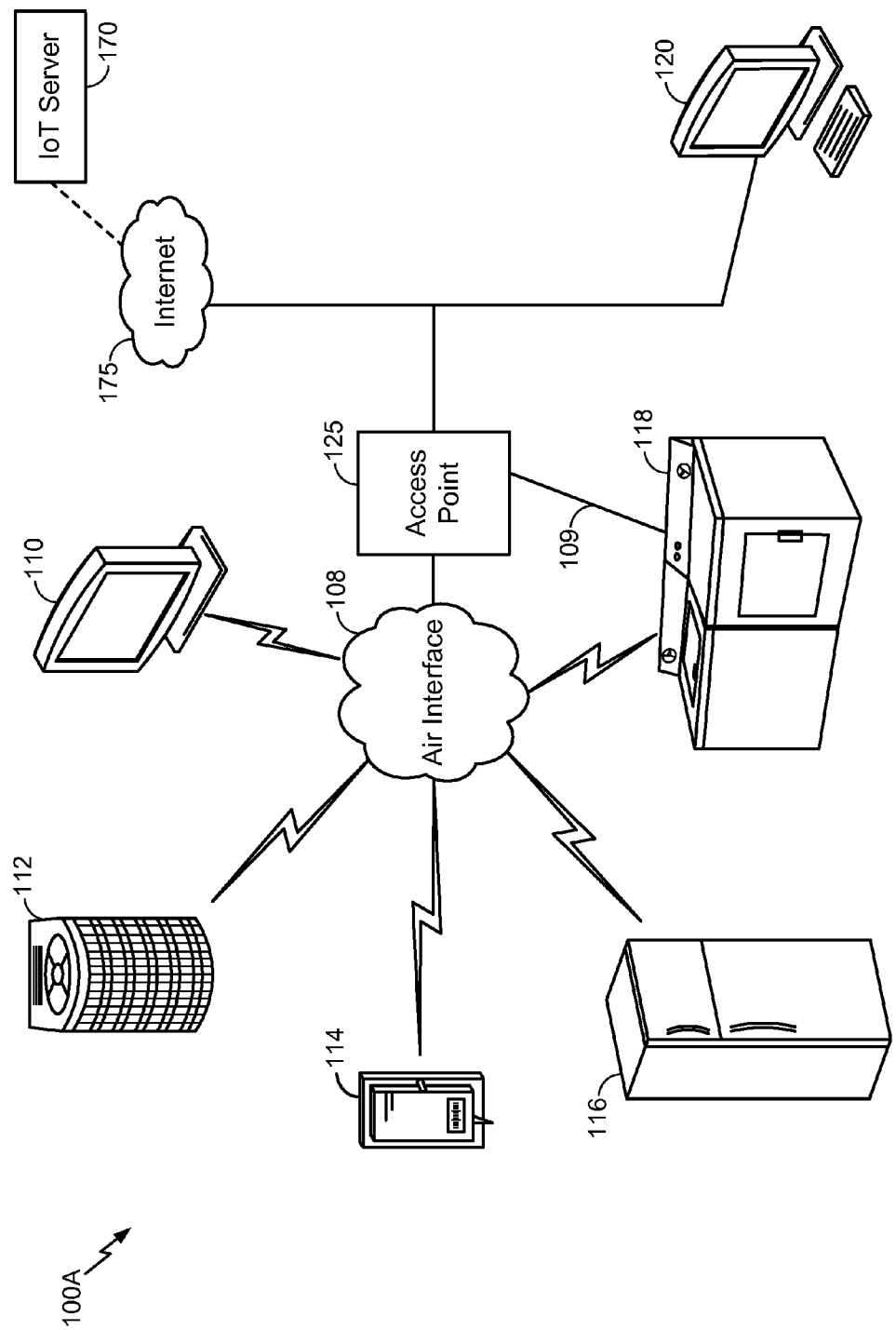
FIG. 1A illustrates a high-level system architecture of a wireless communications system in accordance with an aspect of the disclosure.

Various aspects are disclosed in the following description and related drawings to show specific examples relating to exemplary embodiments for identifying Internet of Things (IoT) devices/objects/people using out-of-band signaling/metadata in conjunction with optical images. In an aspect, a device receives identifying information associated with the nearby IoT device, detects a nearby object in a field of view of a camera application, determines whether or not the nearby object is associated with the nearby IoT device based on the received identifying information, and based on the nearby object being associated with the nearby IoT device, determines that the nearby object corresponds to the object associated with the nearby IoT device. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones (including smartphones), desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
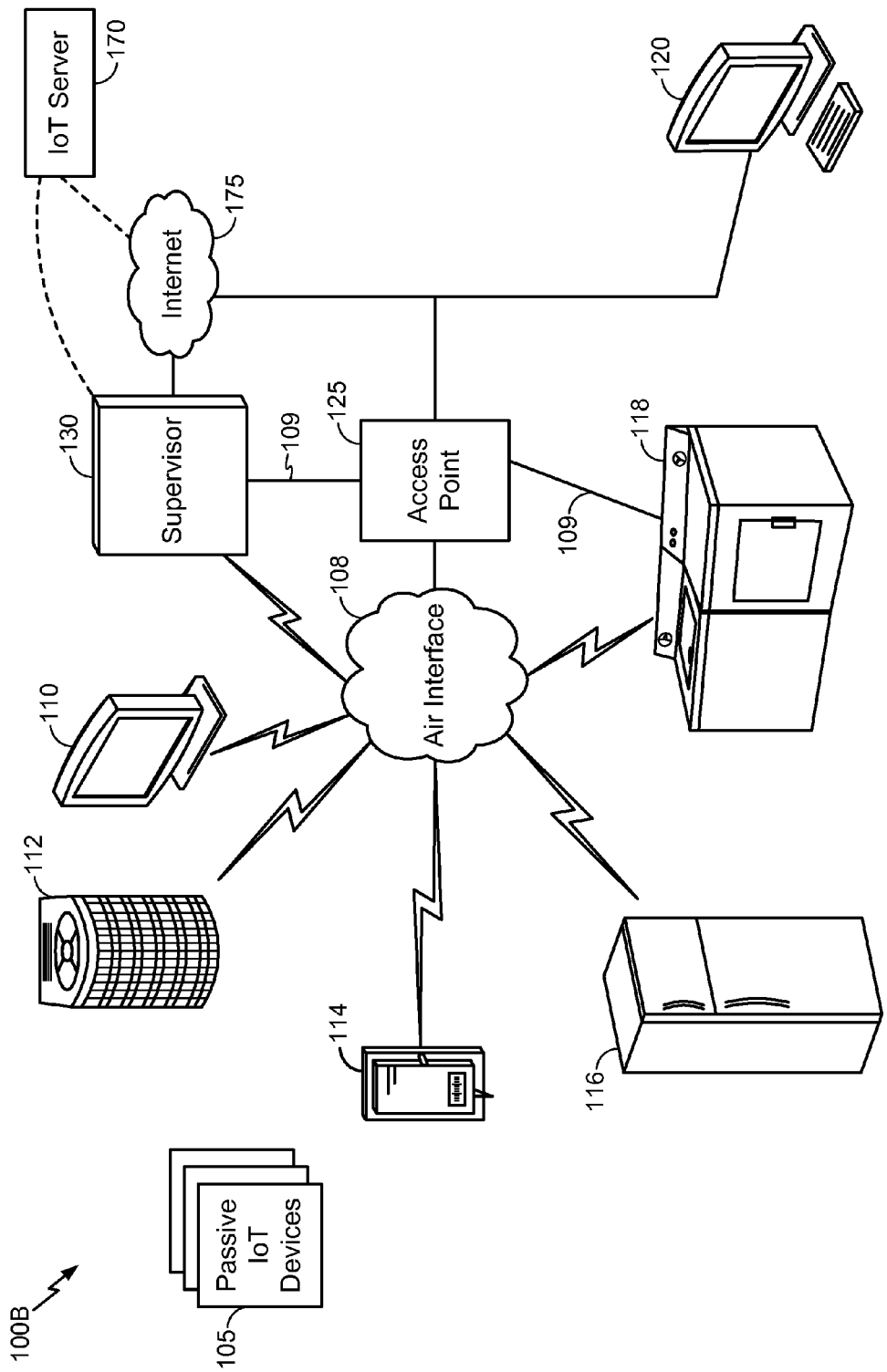
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
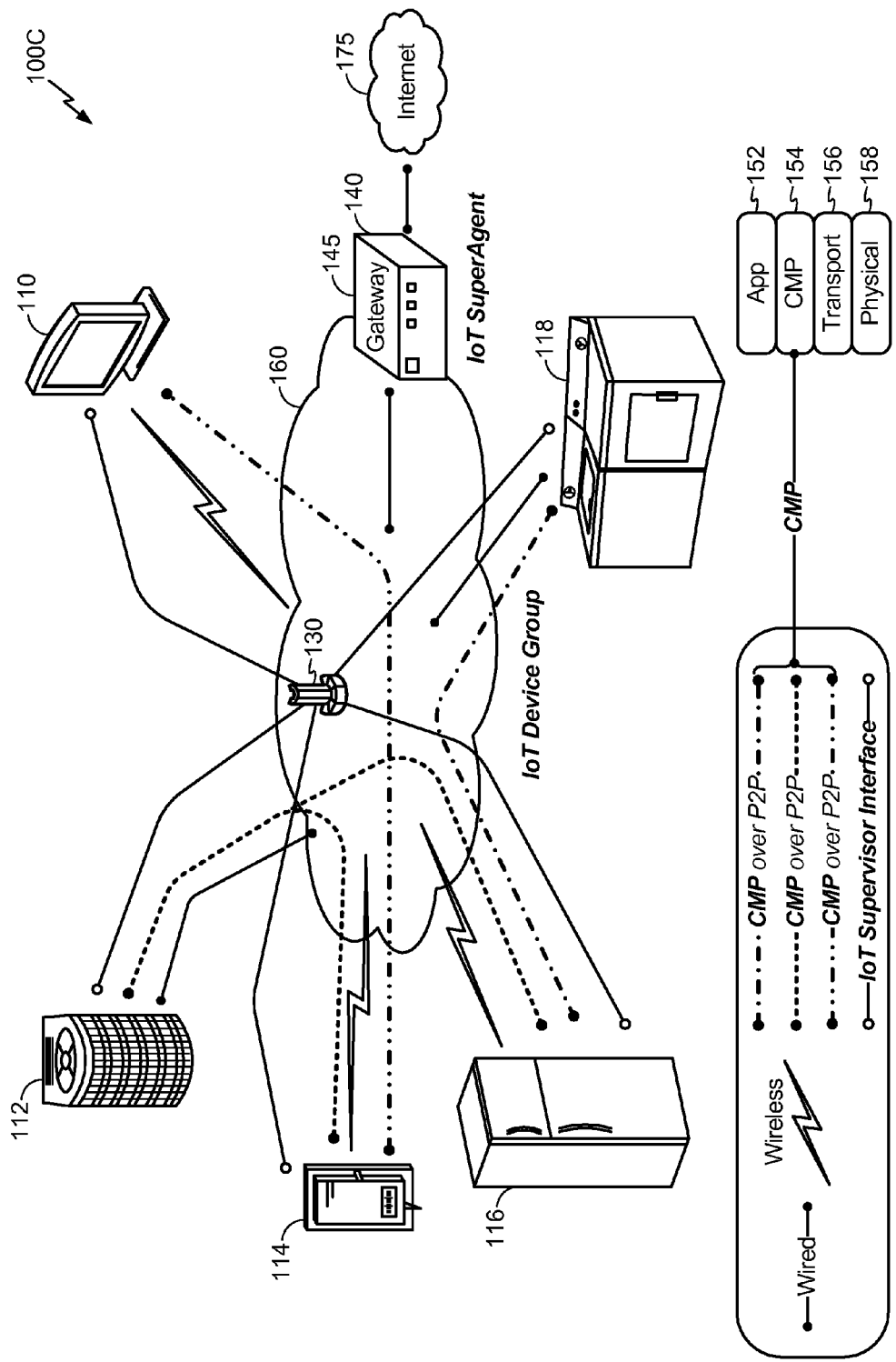
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
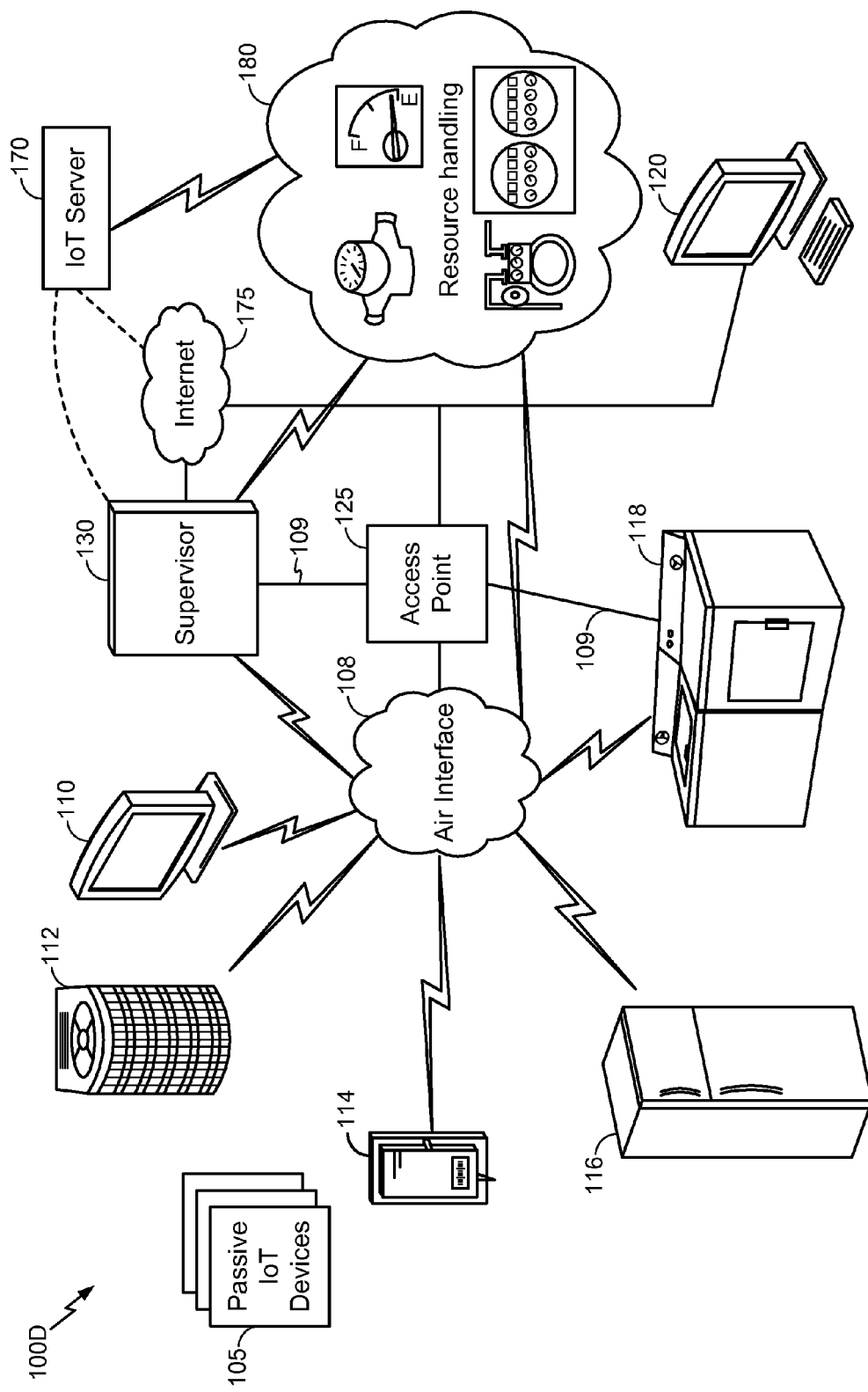
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIG. 1-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
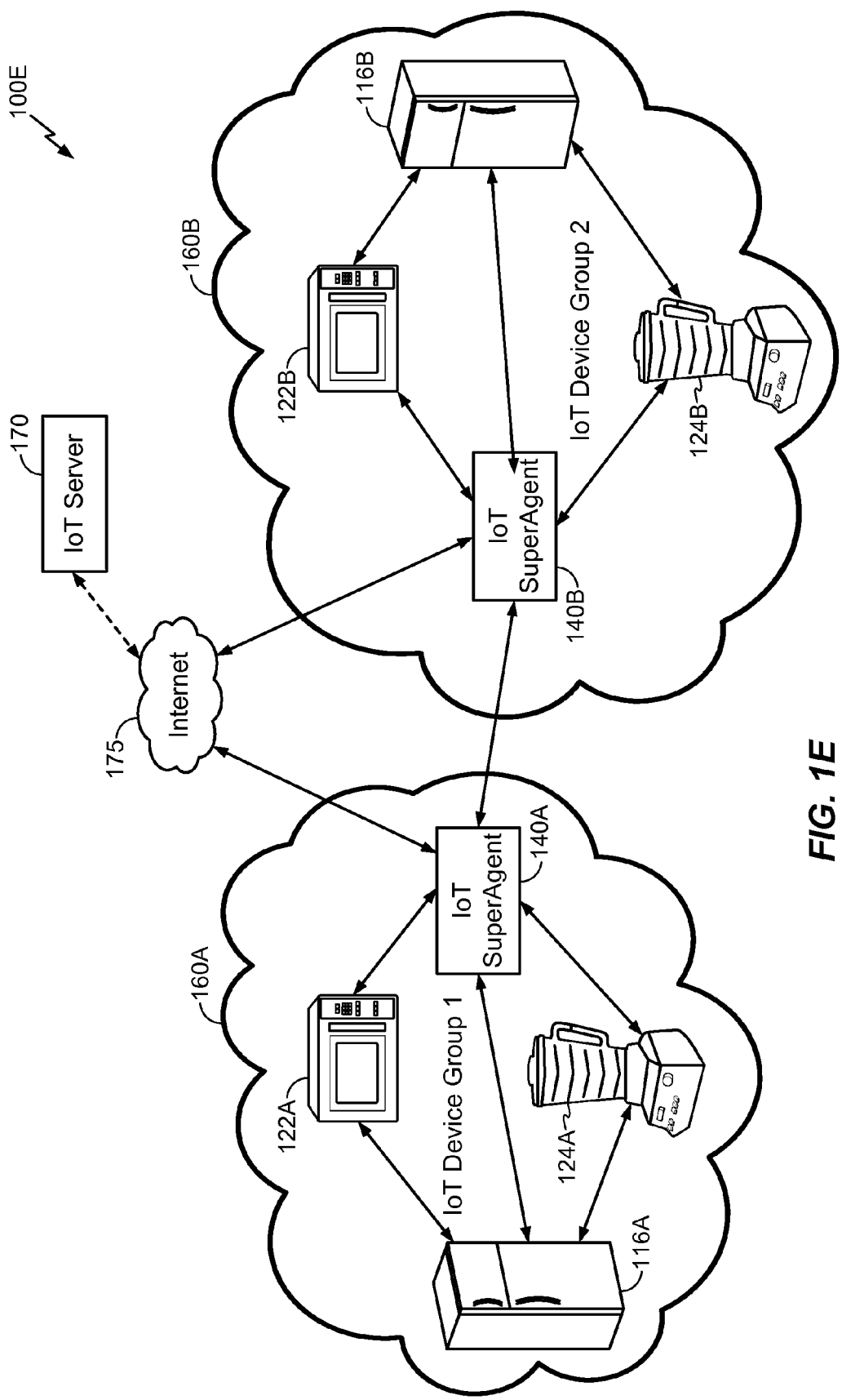
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIG. 1-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via IoT SuperAgents 140A and 140B, those skilled in the art will appreciate that any number of IoT device groups may suitably communicate with each other using IoT SuperAgents.

Figure 2A:
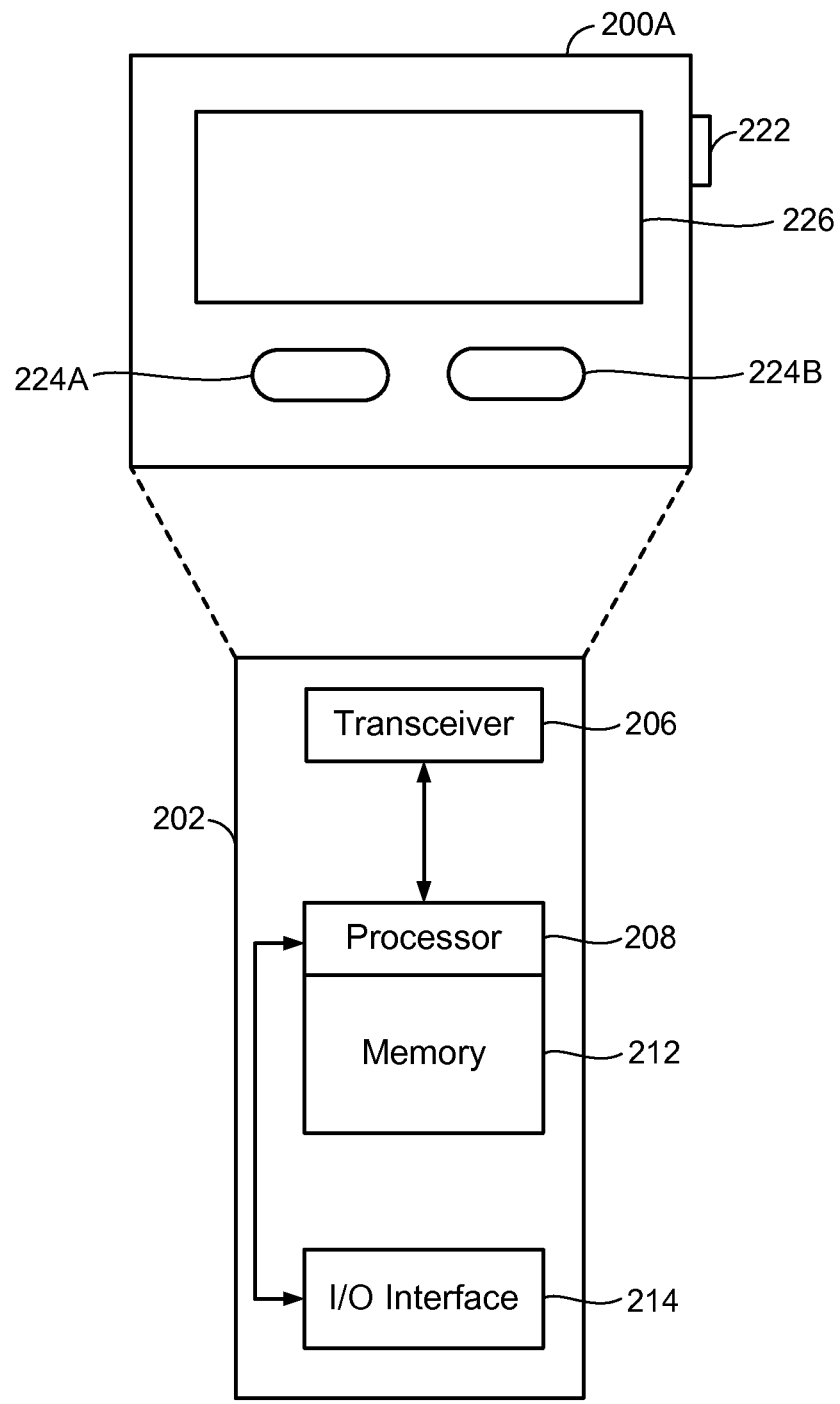

FIG. 2A illustrates a high-level example of an IoT device 200A in accordance with aspects of the disclosure. IoT device 200A may be any IoT device, including a camera or a smartphone. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.). The transceiver 206 may additionally be configured to emit and detect beacon signals and transmit and receive discovery messages and contact cards, as described herein. The transceiver 206 is operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

For example, the transceiver 206 may create an indication to identify an object associated with a nearby IoT device. The transceiver 206 and/or the processor 208 may receive identifying information associated with the nearby IoT device. The processor 208 and/or the I/O interface 214 may detect a nearby object in a field of view of a camera application. The processor 208 may determine whether or not the nearby object is associated with the nearby IoT device based on the received identifying information and, based on the nearby object being associated with the nearby IoT device, may determine that the nearby object corresponds to the object associated with the nearby IoT device.

Figure 2B:
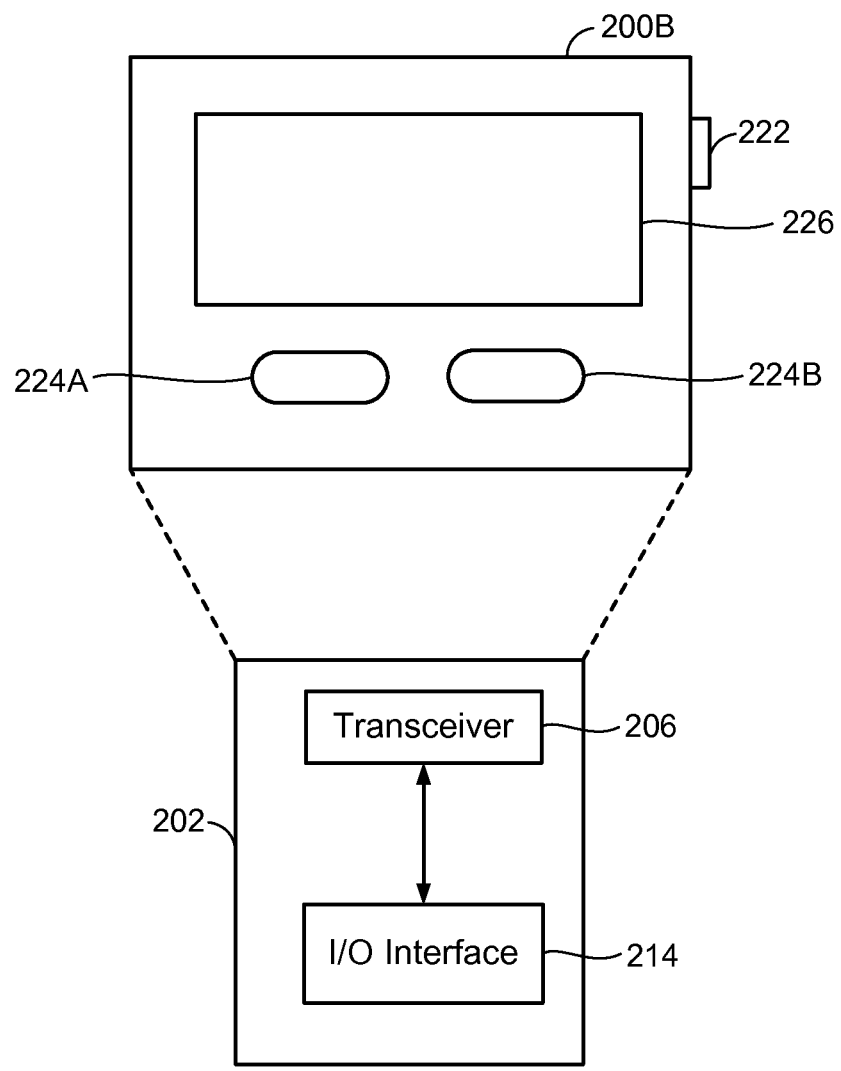
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
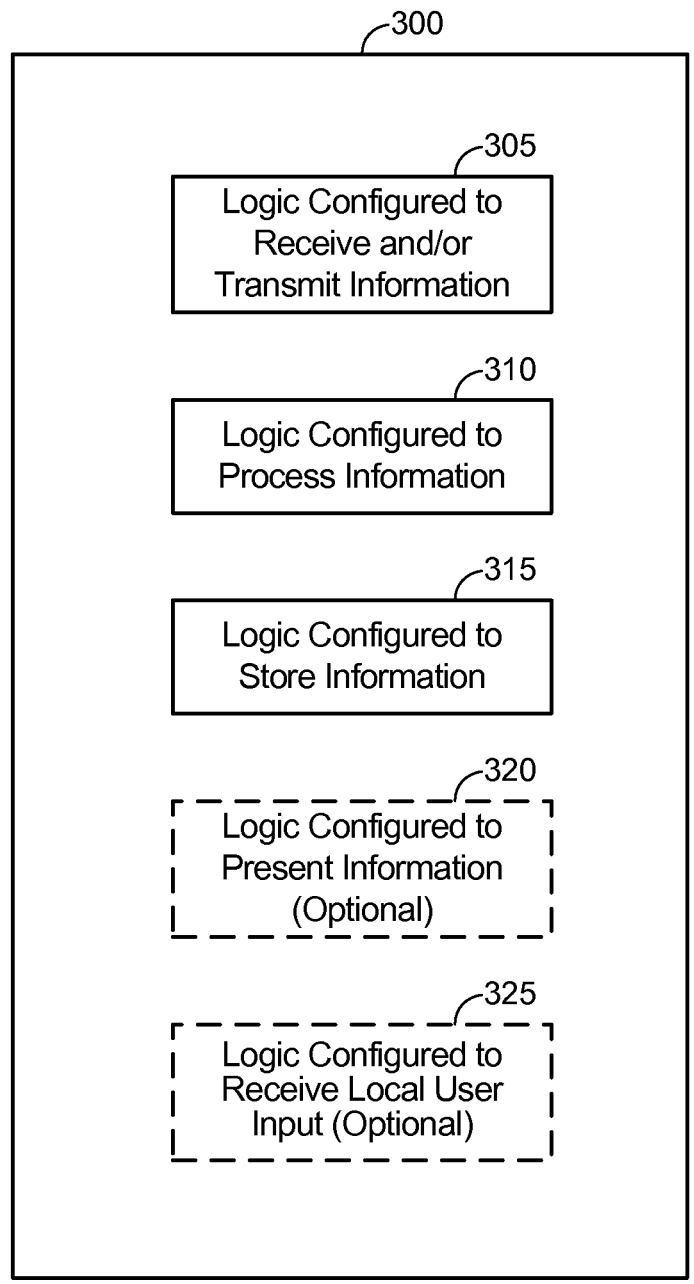
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the IoT server 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. The processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

In an exemplary aspect, the logic configured to receive and/or transmit information 305 may create an indication to identify an object associated with a nearby IoT device. The logic configured to receive and/or transmit information 305 and/or the logic configured to process information 310 may receive identifying information associated with a nearby IoT device. The logic configured to process information 310 and/or the logic configured to receive local user input 325 may detect a nearby object in a field of view of a camera application. The logic configured to process information 310 may determine whether or not the nearby object is associated with the nearby IoT device based on the received identifying information and, based on the nearby object being associated with the nearby IoT device, may determine that the nearby object corresponds to the object associated with the nearby IoT device.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
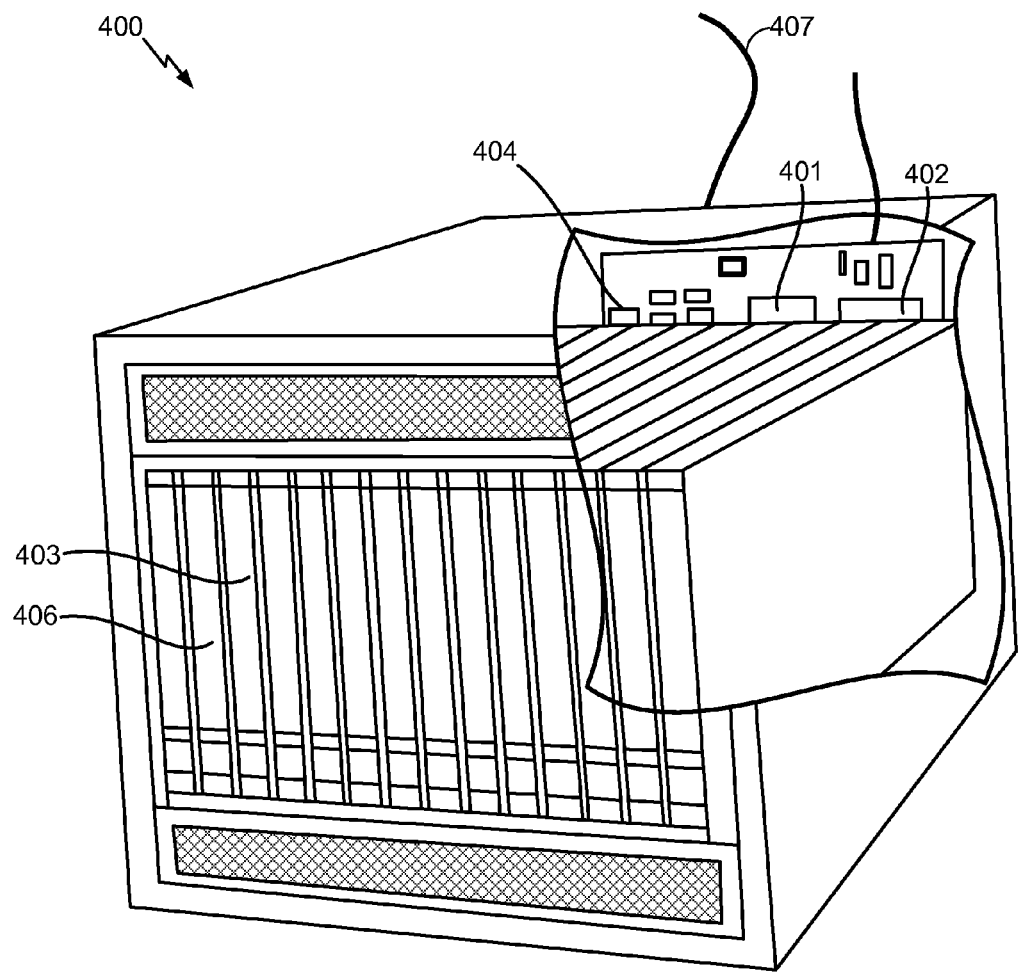
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

IP-based technologies and services have become more mature, driving down the cost and increasing the availability of IP applications. This has allowed Internet connectivity to be added to more and more types of everyday electronic objects. The IoT is based on the idea that everyday electronic objects, not just computers and computer networks, can be readable, recognizable, locatable, addressable, and controllable via the Internet.

Despite the advances in the art, however, there is no mechanism to enable a camera framework to identify objects, such as IoT devices and/or people, in a picture or video of a group of such objects. That is, there is no mechanism for an image capturing device, such as a camera or cell phone, to authoritatively and automatically identify subjects while capturing a photo or video. Current tagging and/or object recognition solutions are performed as a post processing function with baseline data provided before the tagging/recognition process.

Accordingly, the various aspects of the disclosure provide a mechanism to enable a camera application (referred to interchangeably as the "camera," the "application," the "framework," the "camera application," or the "camera framework") to proactively and simultaneously record metadata related to a picture or video during the capturing. The disclosed camera application captures the picture or video and simultaneously gathers identifying information about the subjects of the picture or video. The identifying information may be obtained via out-of-band signaling using various sensors, such as directional microphones, light sensors, infrared (IR) sensors, accelerometers, and the like.

In an aspect, the camera application can use a beacon, such as a light or sound beacon, to identify subjects of a picture or video. Specifically, when taking a picture or recording a video, the camera application transmits a beacon to nearby IoT devices. The nearby IoT devices respond with their own beacons, which include identifying information of the associated user and information identifying the beacon. The camera application can match the received beacon to the corresponding IoT device, and thus to the identifying information.

Figure 5A:
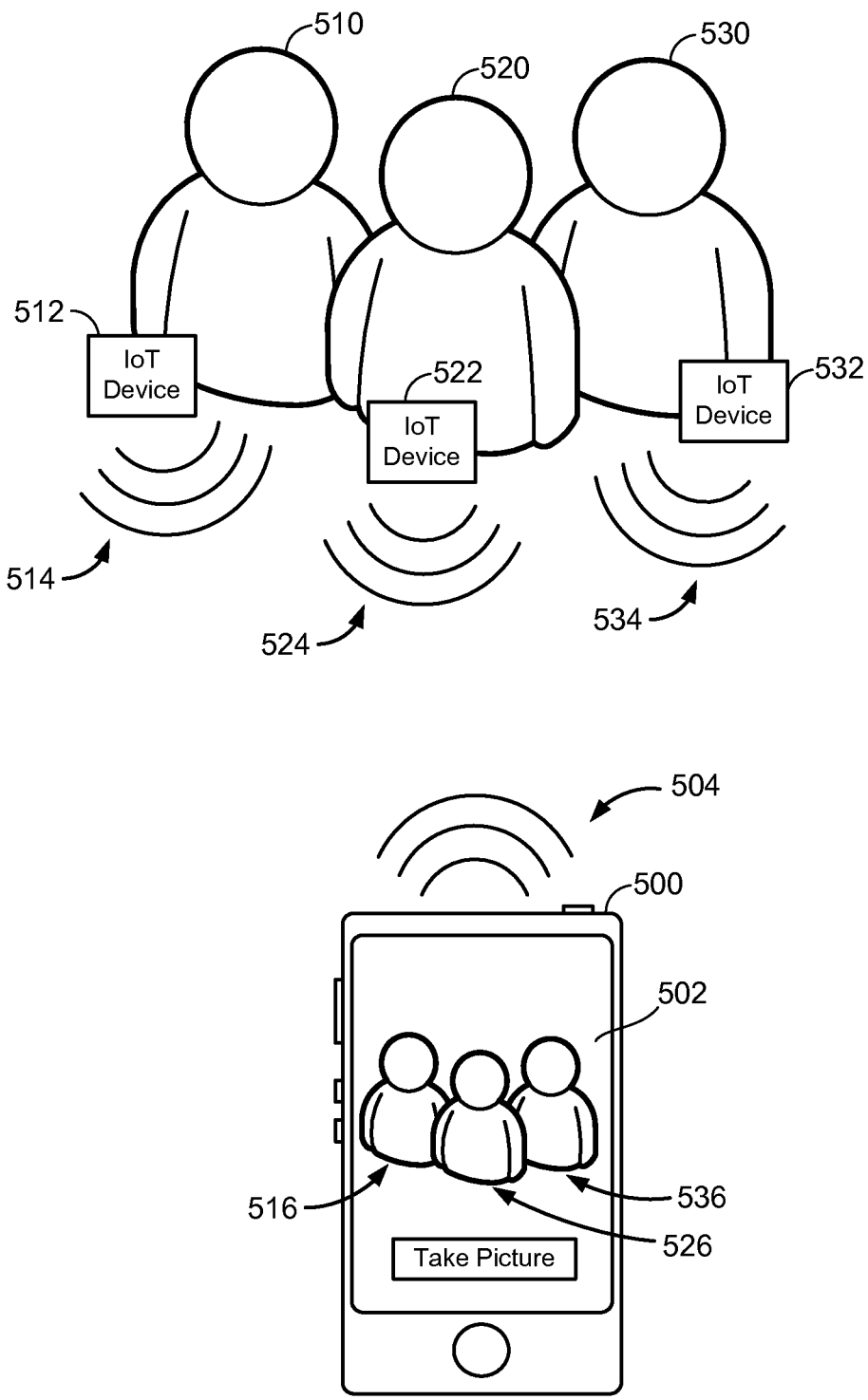
FIG. 5A illustrates an exemplary aspect in which a camera application can use a beacon, such as a light or sound beacon, to identify subjects of a picture or video.

FIG. 5A illustrates an exemplary aspect in which a camera application 502 can use a beacon, such as a light or sound beacon, to identify the subjects of a picture or video. When a user activates the camera application 502 on a UE 500, which may be a cell phone or a camera, for example, the camera application 502 can cause the UE 500 to broadcast a beacon 504 in the direction of the shot indicating that the UE 500 is about to take a picture or record a video. The beacon 504 may be, for example, a sound beacon at a frequency inaudible to humans, or a light beacon in a range invisible to humans. Any IoT devices within range of the beacon, such as IoT devices 512, 522, and 532, for example, can respond with their own beacons 514, 524, and 534, respectively, which may also be sound beacons at a frequency inaudible to humans or light beacons in a range invisible to humans. For example, IoT device 512 may be a cell phone, and may respond with a 21 KHz sound beacon 514. IoT device 522 may be a watch, and may use its LED to respond with a 2500K color light beacon 524. IoT device 532 may be a smart phone, and may respond with a 40 KHz sound beacon 534.

Each IoT device 512, 522, and 532 also passes a "contact card" or other data identifying the associated users 510, 520, and 530, respectively, to the UE 500. The responding IoT devices 512, 522, and 532 may transmit this information via a local wireless network, such as a WiFi network. Alternatively, if a local wireless network is not available, the IoT devices 512, 522, and 532 may transmit this information over a cellular network, or other wireless transmission medium. The IoT devices 512, 522, and 532 may transmit the beacons 514, 524, and 534 and the identifying information simultaneously or serially, in any order.

The identifying information may include the name and contact information of the corresponding user 510, 520, and 530. The identifying information from each IoT device 512, 522, and 532 also includes a parameter identifying the corresponding beacon 514, 524, and 534. For example, the identifying information from the IoT device 512 may include the parameter "Beacon[S21 KHz]," indicating that the beacon 514 is a 21 KHz sound beacon.

In some cases, the UE 500 may already have the identifying information of one or more of the responding IoT devices. If the responding IoT device is aware of that fact, it may simply transmit an identifier of the contact card and the beacon parameter. Alternatively or additionally, the IoT device may have a specific beacon that it always uses when responding to request beacons, such as beacon 504. In that case, if a responding IoT device knows that it has previously interacted with UE 500, it need not send its beacon parameter to the UE 500 again, as the UE 500 will already know the type of beacon to expect.

As the camera application 502 captures the picture or video, it can perform object recognition, such as facial recognition to determine the proper focus, to identify objects 516, 526, and 536 in the picture or video that may correspond to the received beacons 514, 524, and 534. For example, if the camera application 502 receives three beacons, it knows that there may be at least three objects in the picture or video.

Figure 5B:
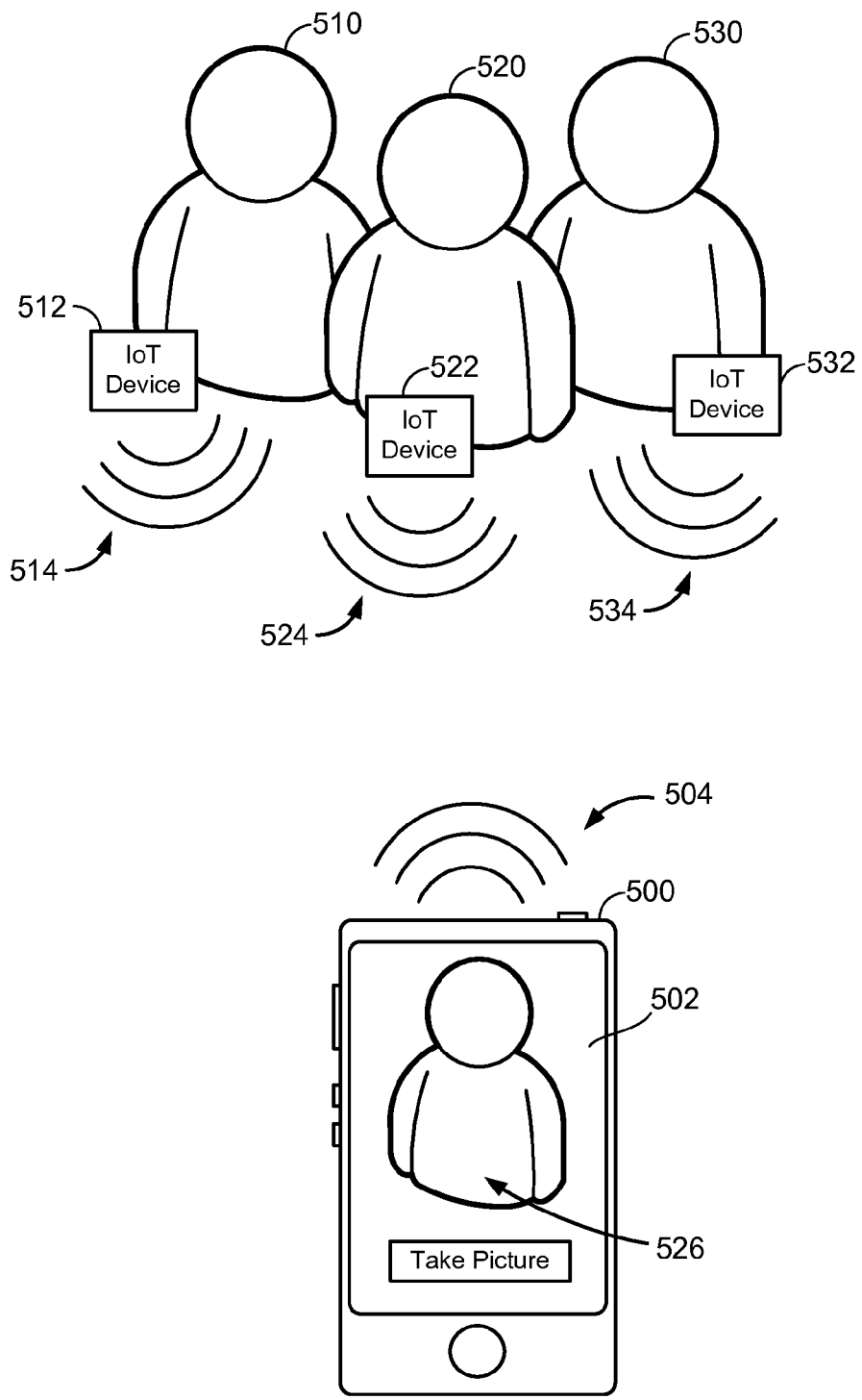
FIG. 5B illustrates an exemplary aspect in which a camera application can use a beacon to identify subjects of a zoomed-in picture or video.

Alternatively, as illustrated in FIG. 5B, if the camera application 502 identifies only one object, for example, such as object 526, but receives the three beacons 514, 524, and 534 (e.g., where the user has zoomed-in the camera application 502 on a specific subject, here, subject 520), the camera application 502 may be able to determine which subject it is zoomed-in on, and therefore which beacon corresponds to the identified object. For example, the camera application 502 may determine that the subjects 510 and 530 are not in its field of view based on not detecting a match between the beacons 514 and 534 and any object detected in the field of view. In that case, the camera application 502 can ignore the beacons 514 and 534 from the other IoT devices 512 and 532. This aspect is described further with reference to FIG. 12.

Referring back to FIG. 5A, the camera application 502 can then correlate the identified objects 516, 526, and 536 with the received beacons 514, 524, and 534 based on the direction from which the beacons 514, 524, and 534 were received. The UE 500 may determine the direction of a beacon using, for example, a directional microphone. In the example of FIG. 5A, the UE 500 can determine that the beacon 514 was received from the left, and thus match object 516 with beacon 514. Likewise, the UE 500 can determine that the beacon 524 was received from the center, and thus match object 526 with beacon 524. Similarly, the UE 500 can determine that the beacon 534 was received from the right, and thus match object 536 with beacon 534.

Once the camera application 502 correlates the received beacons 514, 524, and 534 with the identified objects 516, 526, and 536, the camera applications 502 can tag the identified objects 516, 526, and 536 with the identifying information associated with the beacons 514, 524, and 534. The camera application 502 can store this identifying information as metadata of the captured picture or video.

In another aspect, a camera application can use the temperature of the subjects of a picture or video to identify the subjects. Specifically, the camera application can capture the heat signatures of the subjects of a picture or video. The IoT devices of the subjects, such as watches, shoes, shirts, etc., can send the temperature of their corresponding users along with identifying information of the users to the camera application. The camera application can match the received temperature information to the heat signatures of the users to match each user to the corresponding IoT device, and thus to the corresponding identifying information.

Figure 6:
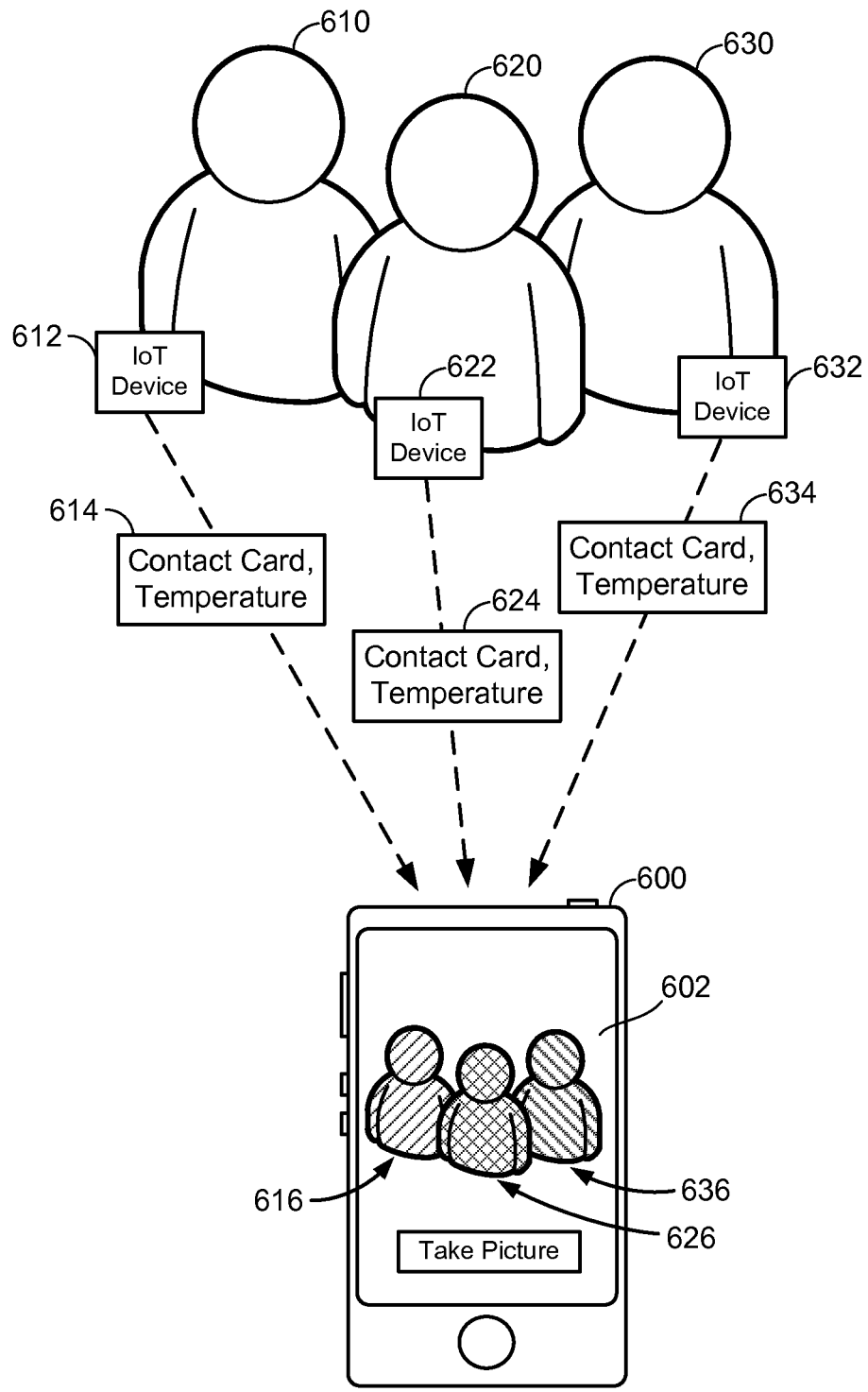
FIG. 6 illustrates an exemplary aspect in which a camera application can use the temperature of the subjects of a picture or video to identify the subjects.

FIG. 6 illustrates an exemplary aspect in which a camera application 602 can use the temperature of the subjects of a picture or video to identify the subjects. When a user activates the camera application 602 on a UE 600, which may be a cell phone or a camera, for example, the camera application 602 can cause the UE 600 to broadcast a beacon, such as beacon 504 in FIG. 5A, in the direction of the shot indicating that the UE 600 is about to take a picture or record a video. The beacon may be a sound beacon at a frequency inaudible to humans, or a light beacon in a range invisible to humans, as discussed above.

Any IoT devices within range of the beacon, such as IoT devices 612, 622, and 632, can respond by sending the UE 600 messages 614, 624, and 634 that include identifying information, such as a contact card, and temperature information of the users 610, 620, and 630. The identifying information may include the name and contact information of the user. The temperature information may include a temperature reading of the user taken by the IoT device. The IoT devices 612, 622, and 632 may be any IoT devices capable of taking a reasonably accurate temperature of a user, such as a watch, a shoe, a button on a shirt, or the like. A cell phone, PDA, or other similar device, may not be able to take a sufficiently accurate temperature, as such devices generate a significant amount of heat themselves, which may interfere with a temperature reading of a user.

As the camera application 602 captures the picture or video, it can perform object recognition, such as facial recognition to determine the proper focus, to identify objects 616, 626, and 636 in the picture or video that may correspond to the received messages 614, 624, and 634.

The camera application 602 can cause the UE 600 to capture the heat signatures of the users 610, 620, and 630 when taking the picture or recording the video. In the example of FIG. 6, user 610 has a particular thermal signature, as illustrated by object 616. Likewise, user 620 has a particular thermal signature, as illustrated by object 626. Similarly, user 630 has a particular thermal signature, as illustrated by object 636. In the example of FIG. 6, the camera application 602 is shown displaying the different heat signatures of the users 610, 620, and 630. However, this is for illustration purposes only, and the camera application 602 may not actually display the thermal view of users 610, 620, and 630.

The camera application 602 can correlate the identified objects 616, 626, and 636 with the temperature information received in messages 614, 624, and 634. That is, the camera application 602 tries to match one of the received temperature information to one of the objects 616, 626, and 636. In some cases, one or more heat signatures determined by the UE 600 may not match any of the received temperature information exactly. In that case, the camera application 602 can match the heat signature of an object to a received temperature information if the two temperatures are within a threshold of each other.

Although not illustrated in FIG. 6, but as discussed with reference to FIG. 5B, if the camera application 602 identifies fewer objects in the captured picture or video than the number of messages 614 to 634 that it receives (e.g., where the camera application 602 is zoomed-in on a specific subject), the camera application 602 may be able to determine which subject(s) it is zoomed-in on, and therefore which message corresponds to the identified object(s). For example, the camera application 602 may determine that one or more of subjects 610 to 630 are not in its field of view based on not detecting a match between the temperature information in one or more of messages 614 to 634 and any object detected in the field of view. In that case, the camera application 602 can ignore the messages that include temperature information that does not match a detected object(s).

In some case, a subject user may not have a uniform heat signature. To address this, the camera application 602 may identify the type of IoT device sending the temperature information, and based on where that IoT device is likely located on the user, the camera application 602 can determine if the received temperature information matches the temperature of the user/subject at that location. For example, if the IoT device is a watch, the camera application 602 can determine the user's temperature around the user's wrist.

Once the camera application 602 correlates the temperature information received in messages 614, 624, and 634 with the identified objects 616, 626, and 636, the camera applications 602 can tag the identified objects 616, 626, and 636 with the corresponding identifying information received in messages 614, 624, and 634. The camera application 602 can then store this identifying information as metadata of the captured picture or video.

In another aspect, a camera application can use the patterns on the subjects of a picture or video to identify the subjects. Specifically, the camera application captures the patterns on the subjects of a picture or video. A "pattern" can be any characteristic of a subject's clothing, for example, that can be identified by the camera application, such as color, stripes, checks, etc. Pattern information can also include micro aspects of the subject's clothing, such as a zoomed-in view of fiber blocks and/or weave, which may be a signature of a particular IoT make/model. The IoT devices of the subjects, such as watches, shoes, shirts, etc., send pattern information of each subject along with identifying information of the subject to the camera application. The camera application then maps the patterns identified in the picture or video to the received pattern information to identify the subject.

Figure 7:
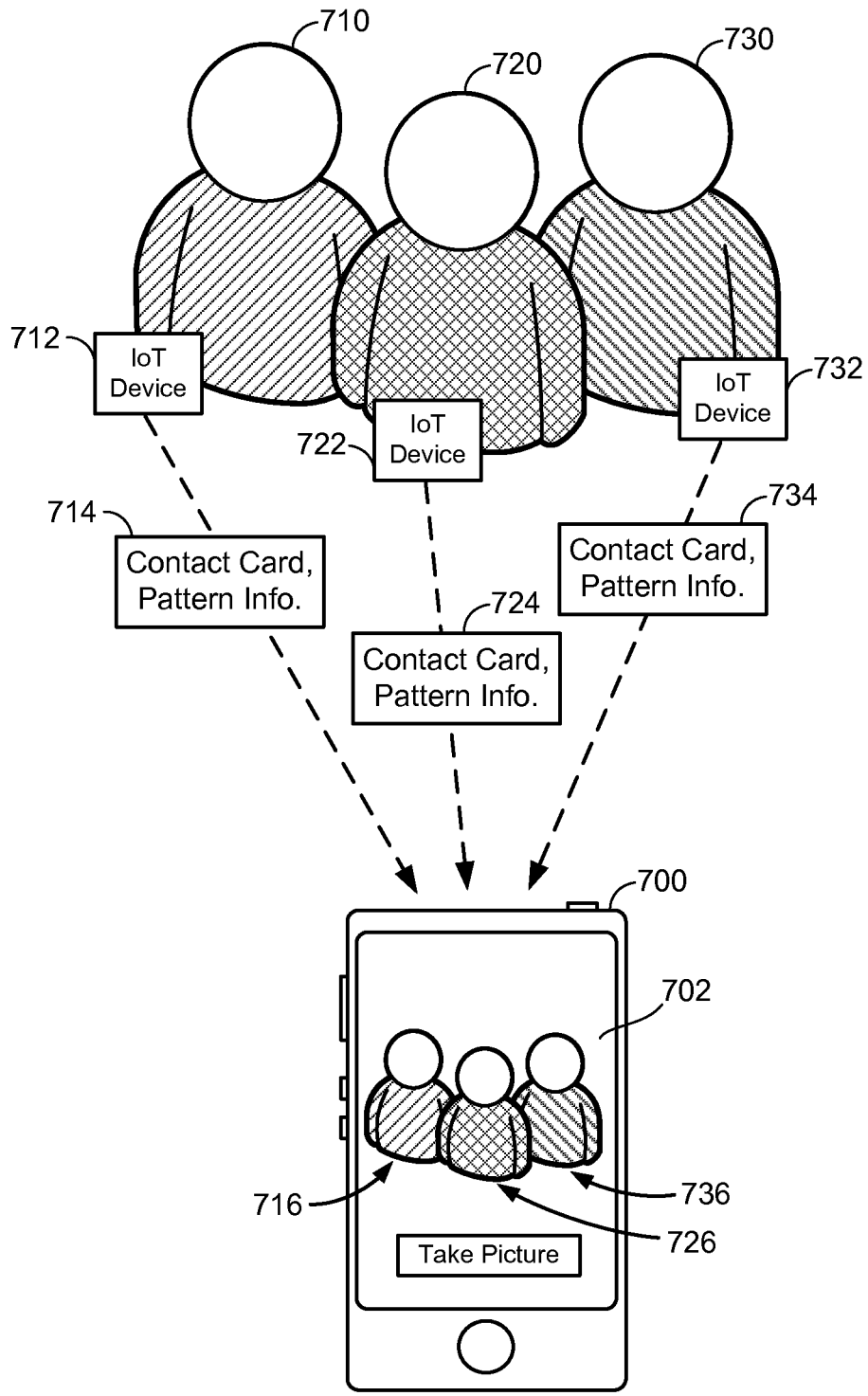
FIG. 7 illustrates an exemplary aspect in which a camera application can use the patterns on the subjects of a picture or video to identify the subjects.

FIG. 7 illustrates an exemplary aspect in which a camera application 702 can use the patterns on the subjects of a picture or video to identify the subjects. When a user activates the camera application 702 on a UE 700, which may be a cell phone or a camera, for example, the camera application 702 can cause the UE 700 to broadcast a beacon, such as beacon 504 in FIG. 5A, in the direction of the shot indicating that the UE 700 is about to take a picture or record a video. The beacon may be a sound beacon at a frequency inaudible to humans, or a light beacon in a range invisible to humans, as discussed above.

Any IoT devices within range of the beacon, such as IoT devices 712, 722, and 732, for example, can respond by sending the UE 700 messages 714, 724, and 734 that include identifying information, such as a contact card, and pattern information of the users/subjects 710, 720, and 730. The identifying information may include the name and contact information of the users 710, 720, and 730. The pattern information may include a pattern identifier of a known pattern, such as the pattern of a name brand shirt, or a pattern name, such as "stripes," or a visual example of the pattern. The IoT devices 712, 722, and 732 may be any IoT devices that would store pattern information, such as a button on a shirt, a button on a pair of pants, the label on a tie, and the like.

As the camera application 702 captures the picture or video, it can perform object recognition, such as facial recognition to determine the proper focus, to identify objects 716, 726, and 736 in the picture or video that may correspond to the received messages 714, 724, and 734.

The camera application 702 can look for objects in the picture or video, such as objects 716, 726, and 736, that have patterns that match the received pattern information. The camera application 702 can then correlate the identified objects 716, 726, and 736 with the received pattern information. That is, the camera application 702 tries to match each received pattern information to one of the objects 716, 726, and 736.

Once the camera application 702 correlates the received pattern information with the identified objects 716, 726, and 736, the camera applications 702 can tag the identified objects 716, 726, and 736 with the corresponding identifying information. The camera application 702 can then store this identifying information as metadata of the captured picture or video.

Although the pattern information described with reference to FIG. 7 has been described as pattern information of the user/subject, it will be apparent that, at least in some cases, references to the pattern information of the user/subject are actually references to the pattern information of the IoT device. For example, if the IoT device is a button on a shirt, the pattern information of the subject/user is actually the pattern information of the shirt/button/IoT device.

Further, although not illustrated in FIG. 7, but as discussed with reference to FIG. 5B, if the camera application 702 identifies fewer objects in the captured picture or video than the number of messages 714 to 734 that it receives (e.g., where the camera application 702 is zoomed-in on a specific subject), the camera application 702 may be able to determine which subject(s) it is zoomed-in on, and therefore which message corresponds to the identified object(s). For example, the camera application 702 may determine that one or more of subjects 710 to 730 are not in its field of view based on not detecting a match between the pattern information in one or more of messages 714 to 734 and any object detected in the field of view. In that case, the camera application 702 can ignore the messages that include pattern information that does not match a detected object(s).

In another aspect, a camera application can use the pose of the subjects of a picture or video to identify the subjects. Specifically, many wearable IoT devices have accelerometers, magnetometers, gyroscopes, and/or the like. The camera application can process a captured image or video and determine the possible angles of the subjects' body parts, such as their heads, arms, torsos, legs, etc. The camera application can match these angles with angle information received from various IoT devices worn by the subjects to identify which subject corresponds to which IoT device, and thus to which identifying information.

Figure 8:
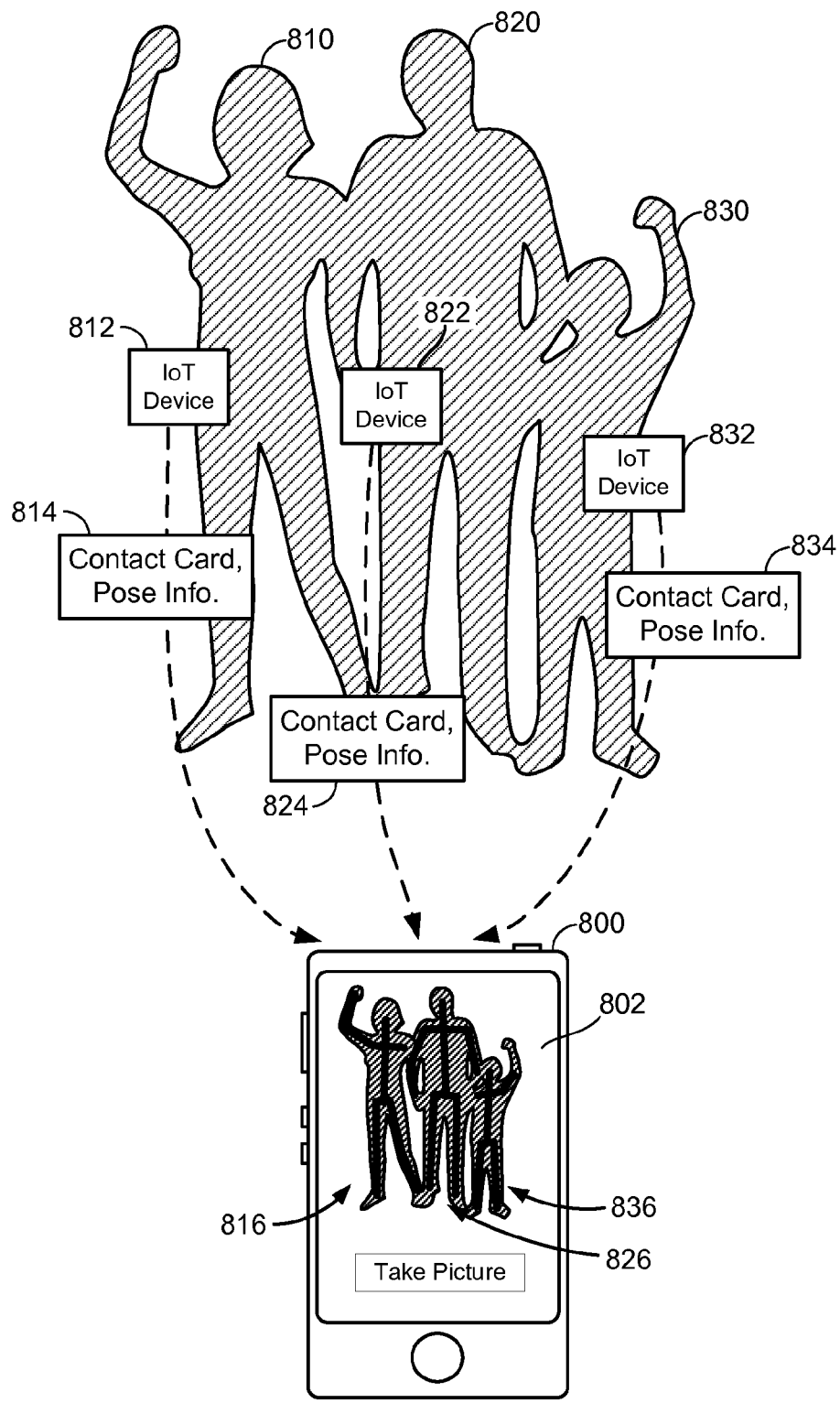
FIG. 8 illustrates an exemplary aspect in which a camera application can use the pose of the subjects of a picture or video to identify the subjects.

FIG. 8 illustrates an exemplary aspect in which a camera application 802 can use the pose of the subjects of a picture or video to identify the subjects. When a user activates the camera application 802 on a UE 800, which may be a cell phone or a camera, for example, the camera application 802 can cause the UE 800 to broadcast a beacon, such as beacon 504 in FIG. 5A, in the direction of the shot, indicating that the UE 800 is about to take a picture or record a video. The beacon may be a sound beacon at a frequency inaudible to humans, or a light beacon in a range invisible to humans, as discussed above.

Any IoT devices within range of the beacon, such as IoT devices 812, 822, and 832, can respond by sending the UE 800 messages 814, 824, and 834 that include identifying information, such as a contact card, and pose information of the users 810, 820, and 830. The identifying information may include the name and contact information of the user. The pose information may include the angle and/or position of the IoT device, as determined by its accelerometer, magnetometer, gyroscope, and/or the like. The IoT devices 812, 822, and 832 may be any IoT devices that could indicate the pose/angle/axis of itself and thereby provide meaningful information about the pose of a user, such as a button on a shirt, a shoe, a watch, and the like.

As the camera application 802 captures the picture or video, it can perform object recognition, such as facial recognition to determine the proper focus, to identify objects 816, 826, and 836 in the picture or video that may correspond to the received messages 814, 824, and 834.

The camera application 802 can determine the body frames, or stick models, of the subjects of the picture or video. The camera application 802 can then correlate the identified objects 816, 826, and 836 with the received pose information. That is, the camera application 802 tries to match a received pose information to one of the identified objects 816, 826, and 836. The camera application 802 may identify the type of IoT device sending the pose information, and based on where that IoT device is likely located on the subject, the camera application 802 can determine if the received pose information matches the angle of the body frame of a subject at that location. For example, if the IoT device is a watch, the camera application 802 can determine the angle of the subject's forearm from the body frame. The determined angles may not always match exactly, in which case, the camera application 802 can match an identified object to received pose information if the two angles are within a threshold of each other.

Once the camera application 802 correlates the received pattern information with the identified objects 816, 826, and 836, the camera applications 802 can tag the identified objects 816, 826, and 836 with the corresponding identifying information. The camera application 802 can then store this identifying information as metadata of the captured picture or video.

Although not illustrated in FIG. 8, but as discussed with reference to FIG. 5B, if the camera application 802 identifies fewer objects in the captured picture or video than the number of messages 814 to 834 that it receives (e.g., where the camera application 802 is zoomed-in on a specific subject), the camera application 802 may be able to determine which subject(s) it is zoomed-in on, and therefore which message corresponds to the identified object(s). For example, the camera application 802 may determine that one or more of subjects 810 to 830 are not in its field of view based on not detecting a match between the pose information in one or more of messages 814 to 834 and any object detected in the field of view. In that case, the camera application 802 can ignore the messages that include temperature information that does not match a detected object(s).

Although the various aspects have been described and illustrated in terms of three IoT devices and users, the various aspects of the disclosure apply when there are any number of subjects of a picture or video, including only one. Further, while the various aspects have been described and illustrated in terms of IoT device users, the subjects being captured may be any object with an associated IoT device, including the IoT device itself.

Figure 9:
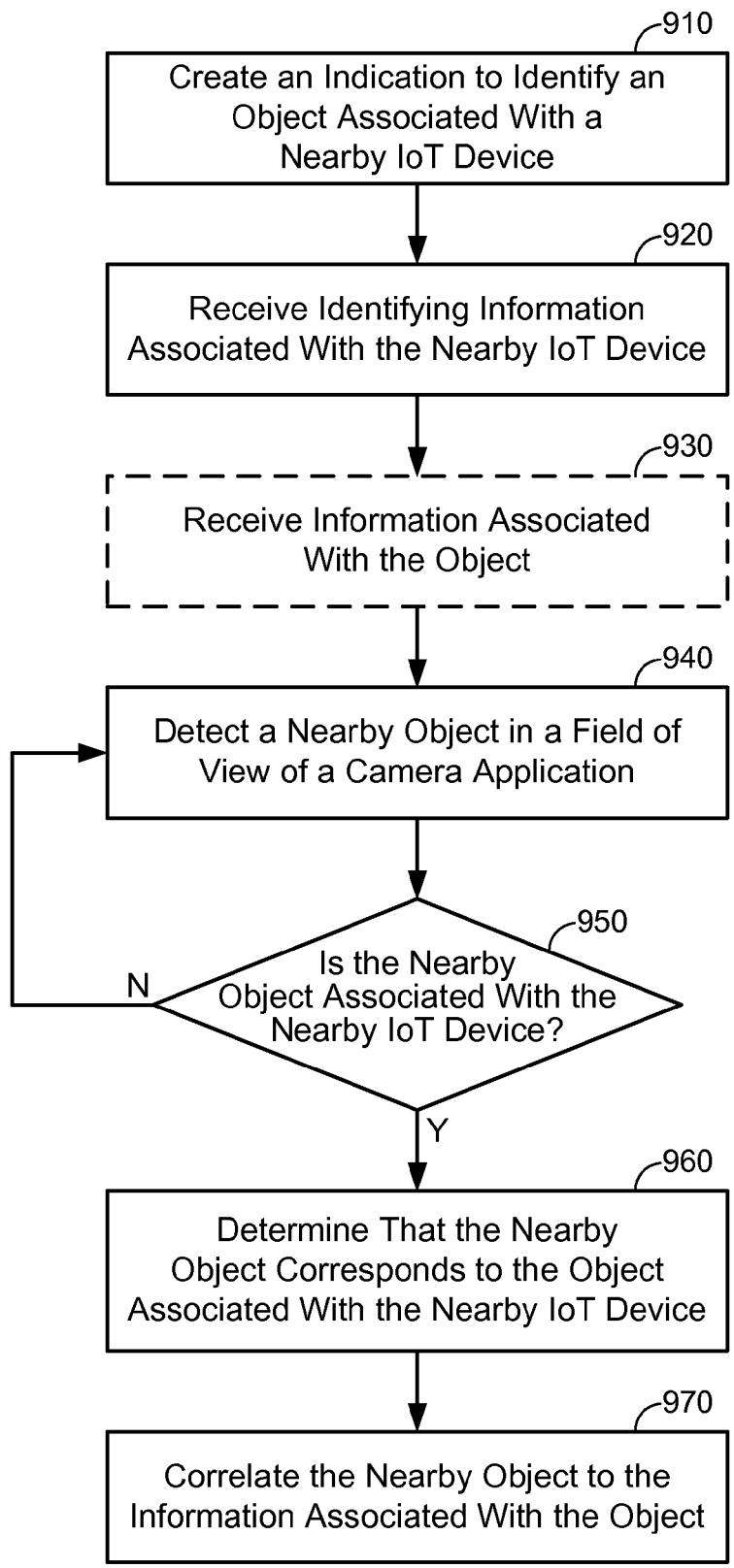
FIG. 9 illustrates an exemplary flow for identifying an object associated with a nearby IoT device.

FIG. 9 illustrates an exemplary flow for identifying an object associated with a nearby IoT device. The flow illustrated in FIG. 9 may be performed by a UE, such as UE 200A, 500, 600, 700, or 800.

At 910, the UE creates an indication to identify the object associated with the nearby IoT device. The UE may create the indication by transmitting a beacon signal to one or more nearby IoT devices, such as beacon 504 in FIG. 5A. As discussed with reference to beacon 504 in FIG. 5A, the beacon signal may be, but is not limited to, a sound beacon or a light beacon.

At 920, the UE receives identifying information associated with the nearby IoT device. The identifying information may be received out-of-band, as described above. The identifying information may be a beacon signal, such as beacon signal 514, 524, or 534 in FIG. 5A. Alternatively, the identifying information may be temperature information of the object, as illustrated in FIG. 6. As another alternative, the identifying information may be pattern information of the IoT device, as illustrated in FIG. 7. As yet another alternative, the identifying information may be angle information of the IoT device, as illustrated in FIG. 8.

At 930, the UE optionally receives information associated with the object. Where the beacon signal is a sound beacon or a light beacon, the information associated with the object may be an indication of the type of the beacon signal and a frequency or color of the beacon signal. The identifying information may include the information associated with the object, in which case this information need not be separately received. The information associated with the object may include contact information where the object is a human.

At 940, the UE detects a nearby object in a field of view of a camera application, such as camera application 502, 602, 702, or 802.

At 950, the UE determines whether or not the nearby object is associated with the nearby IoT device based on the received identifying information. If the identifying information includes the temperature information of the object associated with the nearby IoT device, the UE can determine a temperature of the nearby object and determine whether or not the temperature information is within a threshold of the temperature of the nearby object, as discussed above with reference to FIG. 6. The temperature of the nearby object may be determined based on a position of the IoT device relative to the nearby object.

If the identifying information includes the pattern information of the nearby IoT device, then the UE can determine a pattern of the nearby IoT device and determine whether or not the pattern information matches the pattern of the nearby IoT device, as discussed above with reference to FIG. 7. If the identifying information includes the spatial orientation of the object associated with the nearby IoT device, then the UE can determine the spatial orientation of the nearby object and determine whether or not the spatial orientation of the IoT device matches the spatial orientation of the nearby object, as discussed above with reference to FIG. 8. The spatial orientation of the nearby object may be determined based on a position of the IoT device relative to the nearby object and/or gravity.

At 960, if the nearby object is associated with the nearby IoT device, the UE determines that the nearby object corresponds to the object associated with the nearby IoT device. Otherwise, the flow returns to 940, and the UE attempts to detect another nearby object.

If the identifying information included the temperature information of the object associated with the nearby IoT device, the UE can determine that the nearby object corresponds to the object associated with the nearby IoT device based on the temperature information being within the threshold of the temperature of the nearby object, as discussed above with reference to FIG. 6. If the identifying information included the pattern information of the nearby IoT device, the UE can determine that the nearby object corresponds to the object associated with the nearby IoT device based on the pattern information matching the pattern of the IoT device, as discussed above with reference to FIG. 7. If the identifying information included the spatial orientation of the object associated with the nearby IoT device, the UE can determine that the nearby object corresponds to the object associated with the nearby IoT device based on the spatial orientation of the nearby IoT device matching the spatial orientation of the nearby object, as discussed above with reference to FIG. 8.

At 970, the UE correlates the nearby object to the information associated with the object. The UE may perform the correlation by tagging the nearby object with the information associated with the object in a picture or video of the object associated with the IoT device.

In certain aspects, the object associated with the IoT device may be the nearby IoT device itself.

Although not illustrated in FIG. 9, at 950, if the nearby object is not associated with the nearby IoT device, the camera application can ignore the identifying information associated with the nearby IoT device. Additionally, if the camera application receives identifying information associated with a second nearby IoT device, where the second nearby IoT device is associated with a second nearby object that is not in a field of view of the camera application, the camera application can ignore the identifying information associated with the second nearby IoT device. The camera application may determine that the second nearby object is not in the field of view of the camera application based on not detecting a match between the identifying information associated with the second nearby IoT device and any nearby object detected in the field of view of the camera application.

In an aspect, responding IoT devices should preferably respond using different beacons, temperatures, patterns, and/or angles so that the camera application can distinguish between them. However, where two or more IoT devices respond with the same or similar beacons, temperatures, etc., the camera application can use two or more methods of identifying IoT devices, and thus the subjects of the picture or video. For example, if two IoT devices respond to the camera application's beacon with the same sound beacon, the camera application can request additional information, such as the temperatures, patterns, etc., of the two users or IoT devices. The camera application will then have a second way to identify the objects in the picture or video. Alternatively, the camera application may request that one of the IoT devices transmit its beacon again, but this time using a different type of beacon.

Where multiple types of subject metadata (i.e., beacons, heat signatures, pattern information, and/or posture information) are available, the camera application can apply a weighting function to the different methods for identifying the subjects of the image or video to determine which method provides the most accurate subject identification. For example, in a particular situation, the camera application may assign a higher weight to the beacon subject identification method and a lower weight to the pose subject identification method. In that case, the camera application will use the received beacons to identify the subjects of the image or video.

When transmitting the beacon in the direction of the shot to notify other IoT devices that the camera application is taking a picture or recording a video, the camera application can also request that the subject IoT devices respond with each type of subject metadata that they are capable of gathering and transmitting. Alternatively, the responding IoT devices may be programmed to respond to a beacon with each type of subject metadata that they are capable of gathering and transmitting. For example, the camera application may receive a light beacon, temperature information, and pose information from one subject IoT device, and a sound beacon, pattern information, and pose information from another subject IoT device.

When the camera application receives more than one of the same types of subject metadata from each subject IoT device, a scene analyzer function can rank each of the same types of subject metadata based on their variance across the subject IoT devices. That is, the scene analyzer function can rank the types of subject metadata received from each subject IoT device that are the same based on the variation of that type of subject metadata from one subject IoT device to the next. The scene analyzer function can assign the highest ranking to the type of subject metadata with the highest variance across the subject IoT devices, and the lowest ranking to the type of subject metadata with the lowest variance.

The scene analyzer function can then assign a weight to each subject identification method based on the ranking of the corresponding type of subject metadata. The subject identification method corresponding to a type of subject metadata is the subject identification method that uses that type of subject metadata to identify the subject(s) of an image or video. For example, using pose information to identify the subject(s) of an image or video is a subject identification method, and the pose information is the corresponding type of subject metadata. The scene analyzer function can assign the highest weighting to the subject identification method corresponding to the type of subject metadata with the highest rank/variance, and the lowest weighting to the subject identification method corresponding to the type of subject metadata with the lowest rank/variance.

For example, if a user takes a picture of three other users wearing "smart" watches, the camera application may receive light beacons, temperature information, and pose information from the three watches. The light beacons may be a 2500K color light, a 2600K color light, and a 2400K color light. Each received temperature may be within a tenth of a degree, for example, 97.8, 97.9, and 97.8. The pose information may indicate that each subject user is standing with his or her watch arm at his or her side. The scene analyzer may determine that the light beacons have the greatest variance and the temperature information the least, and assign weights to the corresponding subject identification methods accordingly.

Once the weights are assigned, the camera application can use the subject identification method with the highest weighting to match the subject IoT devices with the objects identified in the image or video (e.g., users associated with the subject IoT devices). Matching the subject IoT devices with the objects identified in the image or video is discussed above with reference to FIGS. 5-9. The camera application may alternatively use the n highest weighted subject identification methods to match the subject IoT devices with the identified objects. Using multiple subject identification methods may increase the confidence in a match.

The camera application can ignore types of subject metadata that are unique to a subject IoT device, or are not shared by each subject IoT device. Alternatively, the camera application could assign such types of subject metadata the lowest rank. As yet another alternative, the camera application could use the subject identification method corresponding to such subject metadata as another method to identify a subject of the image or video, and perhaps to increase the confidence in the identifications.

In an aspect, a camera application may derive input(s) for the scene analyzer function from nearby IoT camera devices and/or a remote server in communication with the nearby IoT camera devices. The camera application can broadcast its weightings to the nearby IoT camera devices and/or a remote server and receive weightings from the other IoT camera devices and/or the server. The camera application can then incorporate the received weightings into its own scene analyzer function, thus improving the accuracy of the weightings and thereby the subject identifications.

Alternatively, the server may provide scene analyzer functionality for the camera application based on information received from the camera application and, optionally, other nearby IoT camera devices. The camera application may send the subject metadata to the server, which can determine the appropriate weightings for the corresponding subject identification methods. The server may also receive subject metadata from other nearby IoT camera devices and determine the appropriate weightings for them as well. The server may determine the weightings for the camera application based only on the subject metadata received from the camera application, or based on the subject metadata received from the camera application and the nearby IoT camera devices. The server may then transmit the determined weightings to the camera application and the nearby IoT camera devices.

Figure 10:
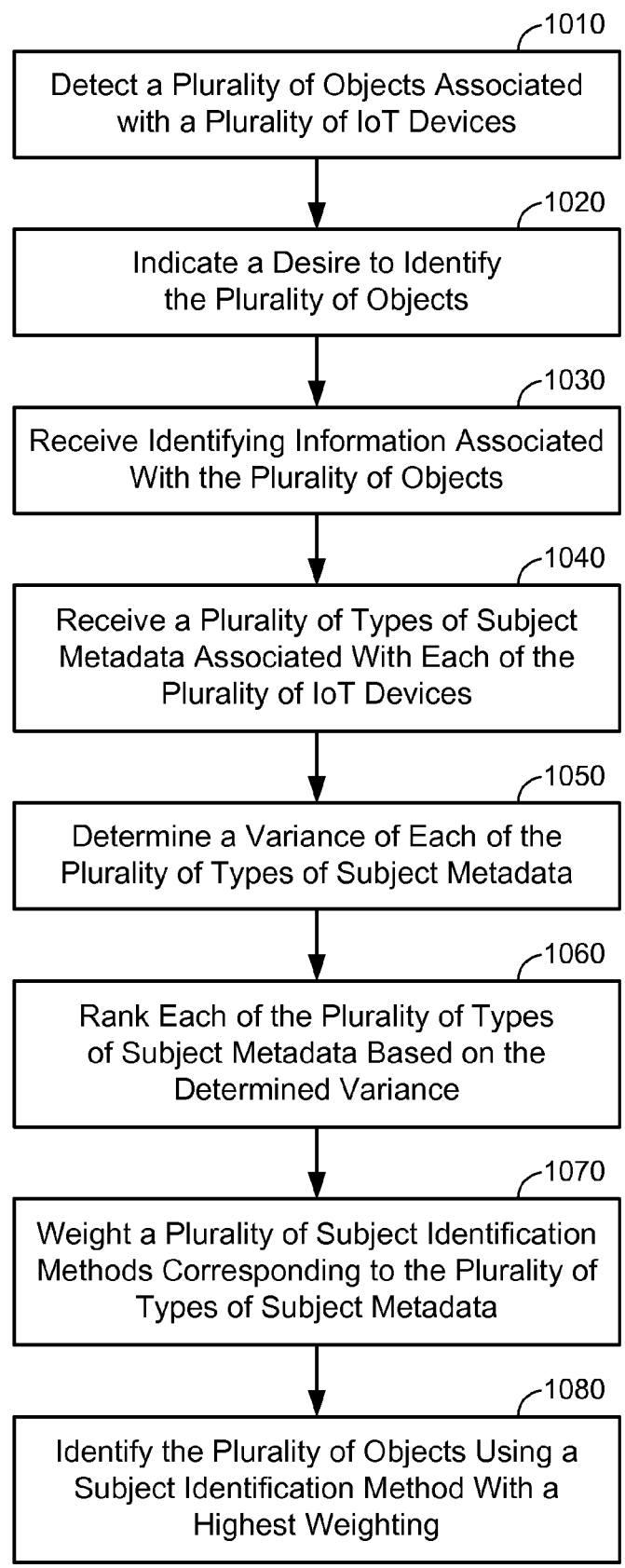
FIG. 10 illustrates an exemplary flow for identifying a plurality of objects associated with a plurality of IoT devices.

FIG. 10 illustrates an exemplary flow for identifying a plurality of objects associated with a plurality of IoT devices. The flow illustrated in FIG. 10 may be performed by a UE, such as UE 200A, 500, 600, 700, or 800.

At 1010, the UE detects the plurality of objects. The detecting may include detecting the plurality of objects by a camera application of the UE.

At 1020, the UE indicates a desire to identify the plurality of objects. The indicating may include transmitting a beacon signal to the plurality of IoT devices, as in 910 of FIG. 9. The beacon signal may be a sound beacon or a light beacon, for example.

At 1030, the UE receives identifying information associated with the plurality of objects from the plurality of IoT devices, as in 920 of FIG. 9. As an example, the plurality of objects may be a plurality of humans, and the received identifying information may be contact information of the plurality of humans.

At 1040, the UE receives a plurality of types of subject metadata associated with each of the plurality of IoT devices, where the plurality of types of subject metadata are the same for each of the plurality of IoT devices. The plurality of types of subject metadata may include two or more of a sound beacon, a light beacon, a heat signature, pattern information, and/or pose information associated with each of the plurality of objects.

At 1050, the UE determines the variance of each of the plurality of types of subject metadata across the plurality of IoT devices.

At 1060, the UE ranks each of the plurality of types of subject metadata based on the determined variance. The highest ranking may be assigned to the type of subject metadata with the highest variance.

At 1070, the UE weights a plurality of subject identification methods corresponding to the plurality of types of subject metadata based on the ranking. The highest weighting may be assigned to the type of subject metadata with the highest ranking. Each of the plurality of subject identification methods may be useable to identify the plurality of objects using a corresponding one of the plurality of types of subject metadata.

At 1080, the UE identifies the plurality of objects using a subject identification method with a highest weighting. The identifying may include determining which of the plurality of objects are associated with which of the plurality of IoT devices using the subject identification method with the highest weighting and associating each of the plurality of objects with identifying information received from a corresponding one of the plurality of IoT devices.

Figure 11:
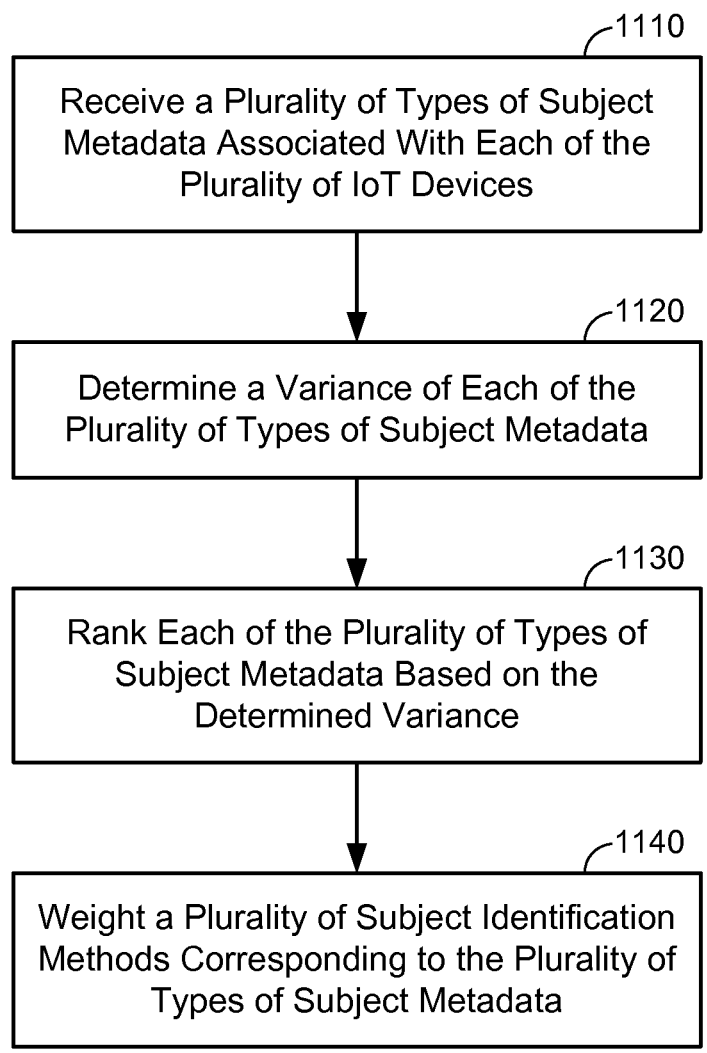
FIG. 11 illustrates an exemplary flow for weighting a plurality of subject identification methods.

FIG. 11 illustrates an exemplary flow for weighting a plurality of subject identification methods. The flow illustrated in FIG. 11 may be performed by a UE, such as UE 200A, 500, 600, 700, or 800. Alternatively, the flow illustrated in FIG. 11 may be performed by a server, such as IoT server 170 or server 400.

At 1110, the UE/server receives a plurality of types of subject metadata associated with each of the plurality of IoT devices, where the plurality of types of subject metadata is the same for each of the plurality of IoT devices. The plurality of types of subject metadata may include two or more of a sound beacon, a light beacon, a heat signature, pattern information, and/or pose information associated with each of the plurality of objects.

If the flow illustrated in FIG. 11 is being performed by a UE, the receiving may include receiving the plurality of types of subject metadata from each of the plurality of IoT devices. If, however, the flow illustrated in FIG. 11 is being performed by a server, the receiving may include receiving the plurality of types of subject metadata from a UE, such as the UE taking the picture or capturing the video.

At 1120, the UE/server determines the variance of each of the plurality of types of subject metadata across the plurality of IoT devices.

At 1130, the UE/server ranks each of the plurality of types of subject metadata based on the determined variance. The highest ranking may be assigned to the type of subject metadata with the highest variance.

At 1140, the UE/server weights a plurality of subject identification methods corresponding to the plurality of types of subject metadata based on the ranking. The highest weighting may be assigned to the type of subject metadata with the highest ranking. Each of the plurality of subject identification methods may be useable to identify the plurality of objects using a corresponding one of the plurality of types of subject metadata.

If the flow illustrated in FIG. 11 is being performed by a server, the server may transmit the weightings to the UE from which the server received the plurality of types of subject metadata.

Figure 12:
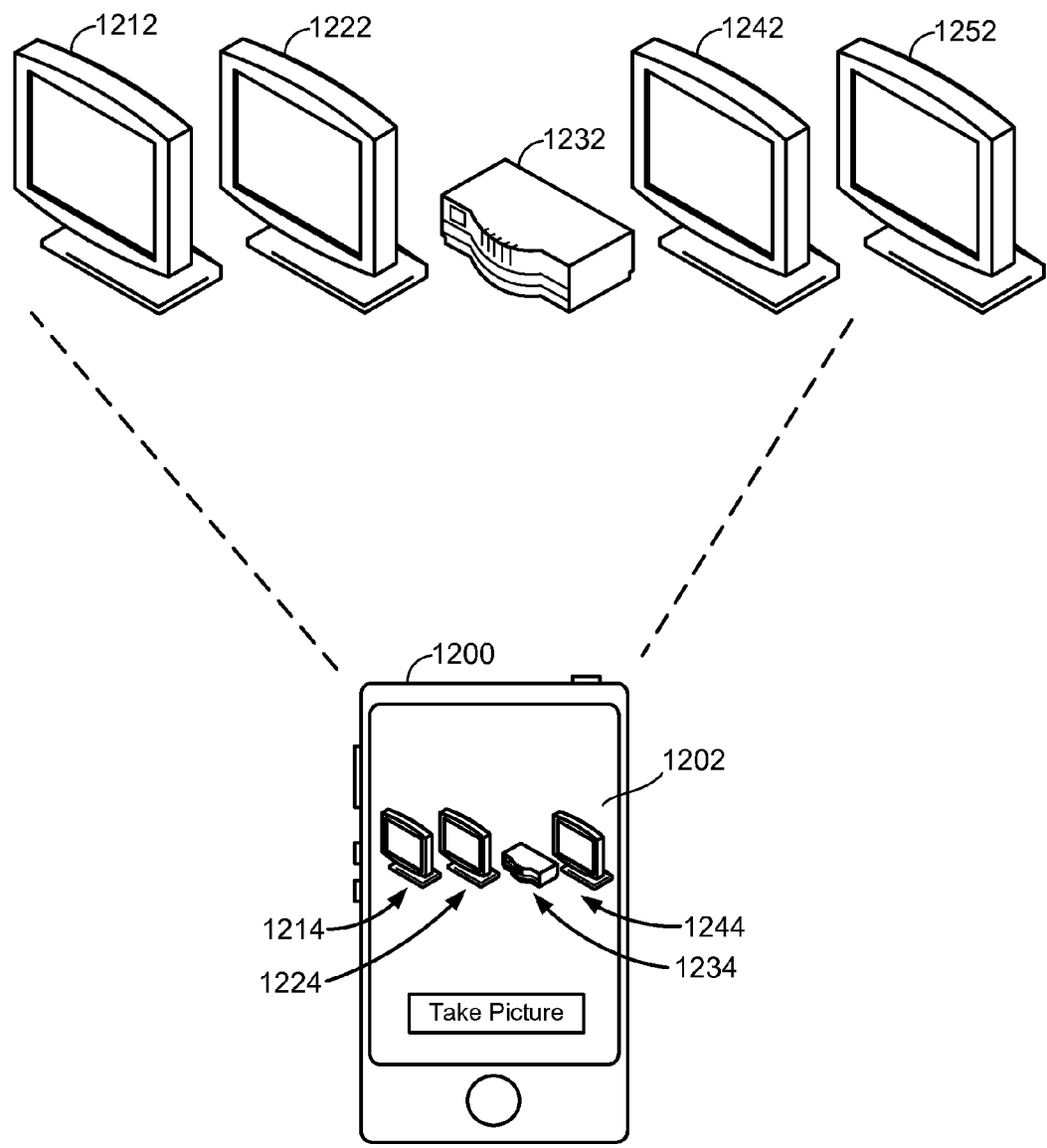
FIG. 12 illustrates an exemplary aspect in which a camera application can ignore beacons from objects that are not in the field of view of the camera application and/or in which the user is not interested.

In certain situations, a user may not wish to identify devices or objects that are not in the field of view of the camera, and/or devices in the field of view of the camera but in which the user is not interested. FIG. 12 illustrates an exemplary aspect in which a camera application 1202 of a UE 1200 can ignore beacons from objects that are not in the field of view of the camera application 1202 and/or in which the user is not interested.

In the example of FIG. 12, a user, using the camera application 1202, may take a picture of several television sets 1212, 1222, and 1242 in a store in order to identify them and perhaps do further research about them on UE 1200. However, there may be other devices that are also captured in the picture, such as a Blu-Ray™ player 1232, in which the user is not interested. There may also be other devices outside of the field of view of the camera application 1202 that the user does not wish to identify, such as television 1252.

The field of view of the camera application 1202, illustrated as dashed lines in FIG. 12, may be configurable based on the user, UE 1200, and/or application settings. For example, the field of view may vary based on the position of the user relative to the subjects of the picture, the field of view of the camera lens on UE 1200, and/or the zoom setting of the camera application 1202.

In the example of FIG. 12, the UE 1200 may be equipped with one or more microphones, one or more speakers, and/or one or more LED probes, each of which may or may not be directional. These components can emit one or more beacons in the field of view of the camera application 1202 and receive one or more out-of-band identifying metadata from at least devices within the field of view of the camera application 1202, as described above with reference to FIG. 5A. Similarly, devices 1212-1252 may be equipped with one or more microphones, one or more speakers, and/or one or more LED probes, each of which may or may not be directional. These components can detect the one or more beacons from the camera application 1202 and respond with their own beacon(s).

Figure 13:
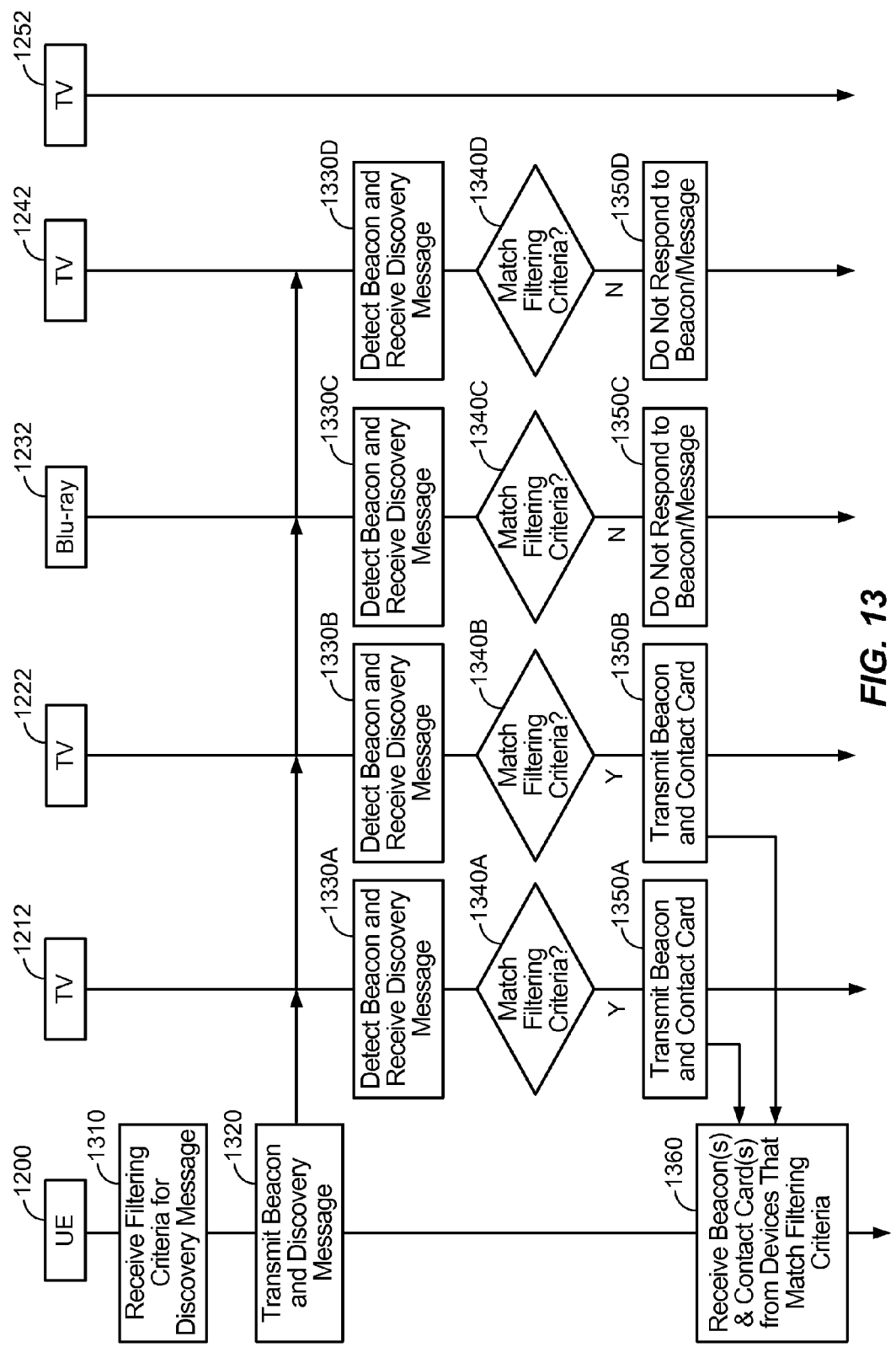
FIG. 13 illustrates an exemplary flow for ignoring beacons from objects that are not in the field of view of the camera application and/or in which the user is not interested.

FIG. 13 illustrates an exemplary flow for ignoring beacons from objects that are not in the field of view of the camera application 1202 and/or in which the user is not interested. At 1310, the UE 1200, or the camera application 1202, receives filtering criteria for the types of devices in which the user is interested. The filtering criteria may be received from the user via a user interface of the UE 1200. In the example of FIG. 12, the filtering criteria may relate to the size and/or resolution of the television screen, the type of screen (e.g., LCD, LED, plasma, etc.), the refresh speed, the price, etc.

At 1320, the UE 1200 emits a beacon indicating its desire to identify the objects in the field of view of the camera application 1202, such as at 910 of FIG. 9. The beacon may be an audio or light beacon emitted out-of-band, as discussed with reference to FIG. 5A. If the UE 1200 has a directional microphone and/or LED, it can emit the beacon only within the field of view of the camera application 1202, or at least as nearly as possible. In this way, devices outside the field of view of the camera application 1202 (e.g., device 1252) are ignored and will not respond to the beacon.

Also at 1320, the UE 1200 broadcasts the filtering criteria in an in-band discovery message to the devices in the field of view of the camera application 1202. The discovery message may also include a request that the receiving device(s) reply with identifying information if their attributes match the filtering criteria. Although not illustrated in FIG. 12 or 13, the UE 1200 and the devices 1212-1252 are able to communicate with each other in-band, such as over a P2P network (e.g., an AllJoyn™ network), as described with reference to FIG. 1A. Although not illustrated in FIG. 13, the broadcasted discovery message may not be directional or may not be able to be broadcasted only to devices within the field of view of the camera application 1202. In that case, any device within range of the broadcasted discovery message would receive it, including, in the example of FIG. 12, television 1252.

At 1330A-D, the devices 1212-1242, respectively, detect the beacon from UE 1200 and receive the discovery message. Although illustrated as occurring simultaneously, the UE 1200 need not transmit the beacon and discovery message at the same time, and/or the devices 1212-1242 need not detect/receive them at the same time.

At 1340A-D, the devices 1212-1242, respectively, compare the received filtering criteria to their corresponding attributes to determine if there is a match. For example, if the filtering criteria include the type of device (e.g., television), the size and/or resolution of the television screen, the type of screen, the refresh speed, and the price, the devices 1212-1242 compare the received values for the filtering criteria to their corresponding values for these criteria. In the example of FIG. 13, only televisions 1212 and 1222 have attributes matching the filtering criteria. Blu-Ray™ device 1232 may not match the filtering criteria because it is not a television, and television 1242 may not match the filtering criteria because its screen is the wrong resolution or the price is too high, for example. In some cases, a device may not have attributes corresponding to one or more filtering criteria. In such cases, the device may consider this a match or not a match. The discovery message may indicate how a device should treat such a situation, i.e., whether it should be treated as a match or not a match.

At 1350A-B, devices 1212-1222, respectively, emit a beacon and transmit their contact card to UE 1200, as described above with reference to FIG. 5A. In the example of FIGS. 12 and 13, the contact card would include identifying information of the devices 1212-1222 and at least the attributes matching the filtering criteria. At 1350C-D, devices 1232-1242 do not respond to the beacon and discovery message because they do not match the filtering criteria.

At 1360, the UE 1200 detects the beacons and receives the contact cards from devices 1212-1222, as in 920 and 930 of FIG. 9. The UE 1200, optionally using the camera application 1202, can present this information to the user. Additionally or alternatively, the UE1200/camera application 1202 can tag the objects detected in the field of view of the camera application 1202 (i.e., objects 1214, 1224, 1234, and 1244) with the received information, as in 940-970 of FIG. 9. In cases where devices outside of the field of view of the camera application 1202 receive the beacon and/or the discovery message (e.g., device 1252) and respond to the UE 1200, the UE 1200 can ignore these devices as discussed above with reference to FIG. 5A.

While the flow illustrated in FIG. 13 has been described with reference to FIG. 12, it will be appreciated that the flow of FIG. 13 is not limited to the number and/or types of devices illustrated in FIG. 12, but rather, is applicable to any number and/or types of devices.

Figure 14:
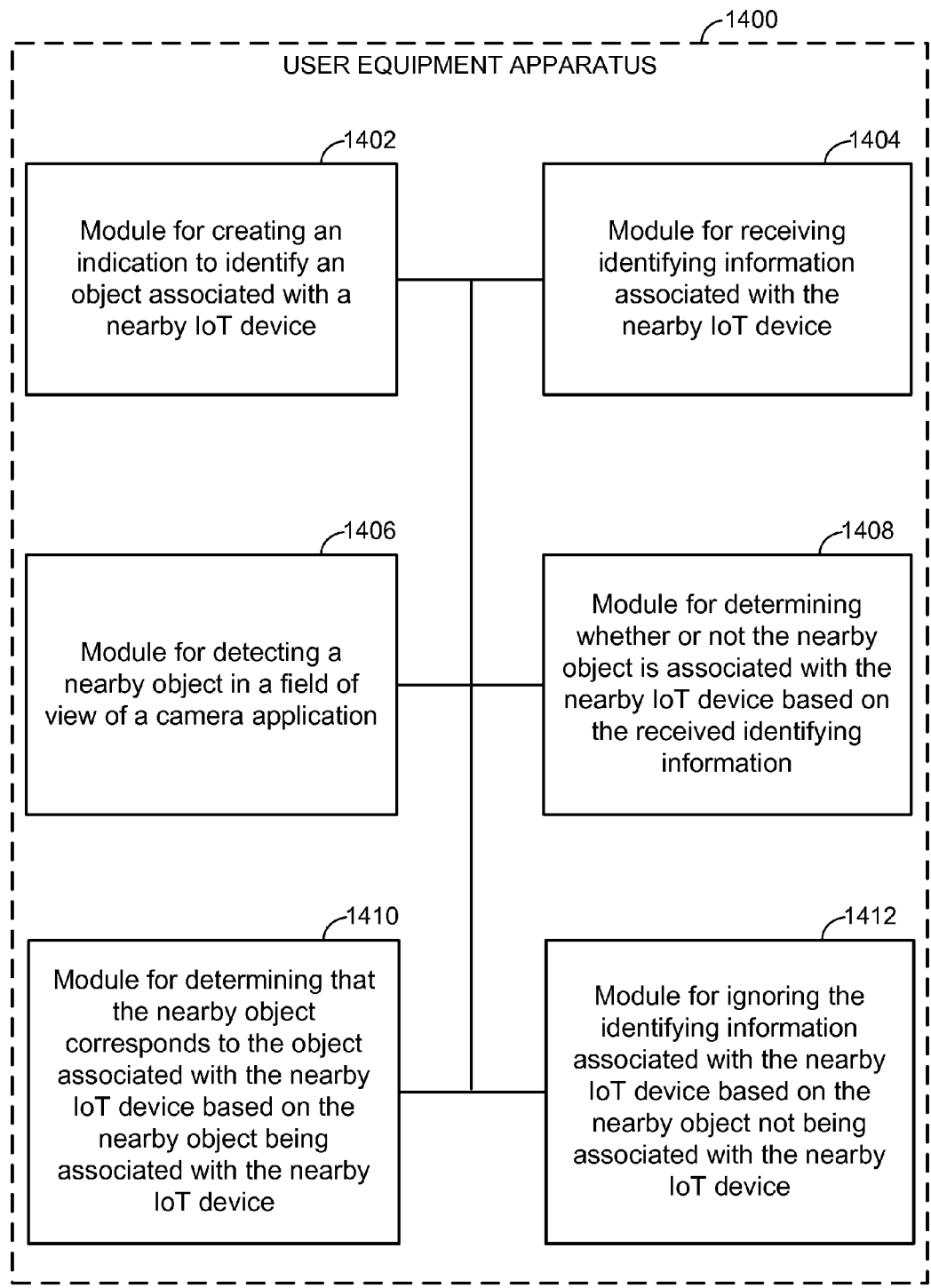
FIG. 14 is a simplified block diagrams of several sample aspects of apparatuses configured to support communication as taught herein.

FIG. 14 illustrates an example UE 1400 represented as a series of interrelated functional modules. A module for indicating a desire to identify an object associated with a nearby IoT device 1402 may correspond at least in some aspects to, for example, a transceiver capable of emitting a beacon as described herein, such as transceiver 206 in FIG. 2A. A module for receiving identifying information associated with the nearby IoT device 1404 may correspond at least in some aspects to, for example, a transceiver, such as transceiver 206 in FIG. 2A, and/or a processing system, such as processor 208 in FIG. 2A, as discussed herein. A module for detecting a nearby object in a field of view of a camera application 1406 may correspond at least in some aspects to, for example, a processing system, such as processor 208 in FIG. 2A, as discussed herein. A module for determining whether or not the nearby object is associated with the nearby IoT device based on the received identifying information 1408 may correspond at least in some aspects to, for example, a processing system, such as processor 208 in FIG. 2A, as discussed herein. A module for determining that the nearby object corresponds to the object associated with the nearby IoT device 1410 may correspond at least in some aspects to, for example, a processing system, such as processor 206 in FIG. 2A, as discussed herein. A module for ignoring the identifying information associated with the nearby IoT device 1412 may correspond at least in some aspects to, for example, a processing system, such as processor 206 in FIG. 2A, and/or a transceiver, such as transceiver 206 in FIG. 2A, as discussed herein.

The functionality of the modules of FIG. 14 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 14, as well as other components and functions described herein, may be implemented using any suitable means. Such means also may be implemented, at least in part, using corresponding structure as taught herein. For example, the components described above in conjunction with the "module for" components of FIG. 14 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for identifying an object associated with a nearby Internet of Things (IoT) device, comprising:
   receiving identifying information associated with the nearby IoT device;
   detecting a nearby object in a field of view of a camera application;
   determining whether or not the nearby object is associated with the nearby IoT device based on the received identifying information matching information associated with the nearby object detected by the camera application in the field of view of the camera application; and
   based on the nearby object being associated with the nearby IoT device, correlating the nearby object with information associated with the object associated with the nearby IoT device.

2. The method of claim 1, further comprising:
   creating an indication to identify the object associated with the nearby IoT device.

3. The method of claim 2, wherein the creating comprises:
   transmitting a beacon signal to one or more nearby IoT devices, the one or more nearby IoT devices including the nearby IoT device.

4. The method of claim 1, wherein the information associated with the nearby object comprises a beacon signal.

5. The method of claim 4, wherein the beacon signal comprises a sound beacon or a light beacon, and wherein the received identifying information comprises an indication of a type of the beacon signal and a frequency or color of the beacon signal.

6. The method of claim 1, wherein the identifying information comprises temperature information of the object associated with the nearby IoT device, and wherein the determining whether or not the nearby object is associated with the nearby IoT device comprises:
   determining a temperature of the nearby object; and
   determining whether or not the temperature information is within a threshold of the temperature of the nearby object,
   wherein the correlating comprises determining that the nearby object corresponds to the object associated with the nearby IoT device based on the temperature information being within the threshold of the temperature of the nearby object.

7. The method of claim 6, wherein the temperature of the nearby object is determined based on a position of the nearby IoT device relative to the nearby object.

8. The method of claim 1, wherein the identifying information comprises pattern information of the nearby IoT device, and wherein the determining whether or not the nearby object is associated with the nearby IoT device comprises:
   determining a pattern of the nearby IoT device; and
   determining whether or not the pattern information matches the pattern of the nearby IoT device,
   wherein the correlating comprises determining that the nearby object corresponds to the object associated with the nearby IoT device based on the pattern information matching the pattern of the nearby IoT device.

9. The method of claim 1, wherein the identifying information comprises a spatial orientation of the nearby IoT device, and wherein the determining whether or not the nearby object is associated with the nearby IoT device comprises:
   determining a spatial orientation of the nearby object; and
   determining whether or not the spatial orientation of the nearby IoT device matches the spatial orientation of the nearby object,
   wherein the correlating comprises determining that the nearby object corresponds to the object associated with the nearby IoT device based on the spatial orientation of the nearby IoT device matches the spatial orientation of the nearby object.

10. The method of claim 9, wherein the spatial orientation of the nearby object is determined based on a position of the nearby IoT device relative to the nearby object and/or gravity.

11. The method of claim 1, wherein the identifying information is received out-of-band.

12. The method of claim 1, further comprising:
receiving the information associated with the object associated with the nearby IoT device; and
correlating the nearby object to the information associated with the object.

13. The method of claim 12, wherein the correlating comprises tagging the nearby object with the information associated with the object in a picture or video of the object associated with the nearby IoT device.

14. The method of claim 12, wherein the object associated with the nearby IoT device is a human, and wherein the received identifying information comprises contact information of the human.

15. The method of claim 1, wherein the object associated with the nearby IoT device comprises the nearby IoT device.

16. The method of claim 1, further comprising:
based on the nearby object not being associated with the nearby IoT device, ignoring the identifying information associated with the nearby IoT device.

17. The method of claim 1, further comprising:
receiving identifying information associated with a second nearby IoT device, wherein the second nearby IoT device is associated with a second nearby object that is not in a field of view of the camera application; and
ignoring the identifying information associated with the second nearby IoT device.

18. The method of claim 17, wherein the camera application determines that the second nearby object is not in the field of view of the camera application based on not detecting a match between the identifying information associated with the second nearby IoT device and any nearby object detected in the field of view of the camera application.

19. The method of claim 1, wherein the camera application comprises a camera application of a user equipment.

20. The method of claim 19, wherein the nearby IoT device comprises an IoT device within peer-to-peer wireless communications range of the user equipment.

21. The method of claim 1, wherein the receiving comprises receiving a plurality of types of subject metadata associated with each of a plurality of nearby IoT devices associated with a plurality of objects, the plurality of objects including the object associated with the nearby IoT device, and wherein the plurality of types of subject metadata are the same for each of the plurality of nearby IoT devices.

22. The method of claim 21, further comprising:
determining a variance of each of the plurality of types of subject metadata across the plurality of nearby IoT devices;
ranking each of the plurality of types of subject metadata based on the determined variance; and
generating weightings of a plurality of subject identification methods corresponding to the plurality of types of subject metadata based on the ranking.

23. The method of claim 22, wherein a highest ranking is assigned to a type of subject metadata of the plurality of types of subject metadata with a highest variance.

24. The method of claim 23, wherein a highest weighting is assigned to a type of subject metadata of the plurality of types of subject metadata with the highest ranking.

25. The method of claim 22, further comprising:
identifying the plurality of objects using a subject identification method with a highest weighting.

26. The method of claim 22, further comprising:
transmitting the generated weightings to the plurality of nearby IoT devices and/or a server in communication with the plurality of nearby IoT devices.

27. The method of claim 26, further comprising:
receiving weightings of the plurality of subject identification methods from the plurality of nearby IoT devices and/or the server in communication with the plurality of nearby IoT devices, wherein the camera application incorporates the received weightings into the generated weightings.

28. The method of claim 21, wherein the plurality of types of subject metadata comprise two or more of a sound beacon, a light beacon, a heat signature, pattern information, and/or pose information associated with the plurality of objects.

29. The method of claim 22, wherein each of the plurality of subject identification methods is useable to identify the plurality of objects using a corresponding one of the plurality of types of subject metadata.

30. The method of claim 21, further comprising:
transmitting the plurality of types of subject metadata associated with each of the plurality of nearby IoT devices to a server,
wherein the server determines a variance of each of the plurality of types of subject metadata across the plurality of nearby IoT devices, ranks each of the plurality of types of subject metadata based on the determined variance, and generates weightings of a plurality of subject identification methods corresponding to the plurality of types of subject metadata based on the ranking.

31. The method of claim 30, further comprising:
receiving the weightings of the plurality of subject identification methods from the server.

32. The method of claim 30, wherein the server receives subject metadata from other IoT devices, and wherein the server generates the weightings of the plurality of subject identification methods based additionally on the subject metadata received from the other IoT devices.

33. The method of claim 1, further comprising:
transmitting a beacon signal to one or more IoT devices in a field of view of the camera application.

34. The method of claim 33, wherein the beacon signal is transmitted to the one or more IoT devices in the field of view of the camera application using directional speakers.

35. The method of claim 33, further comprising:
transmitting a discovery message to the one or more IoT devices, the discovery message including filtering criteria; and
receiving a beacon signal from each of a subset of the one or more IoT devices, wherein each IoT device of the subset of the one or more IoT devices has attributes that match the filtering criteria.

36. The method of claim 35, further comprising:
receiving the filtering criteria, wherein the filtering criteria is user defined and defines attribute values of the one or more IoT devices in the field of view of the camera application that should respond to the discovery message.

37. The method of claim 35, wherein each of the one or more IoT devices in the field of view of the camera application determines whether or not it has attribute values that match the filtering criteria.

38. The method of claim 37, wherein devices of the one or more IoT devices in the field of view of the camera application determine that they do not have attribute values that match the filtering criteria, and in response, do not respond to the received beacon signal or the discovery message.

39. The method of claim 37, wherein each of the subset of the one or more IoT devices in the field of view of the camera application determines that it has attribute values that match the filtering criteria, and in response, responds to the discovery message by emitting a beacon signal and transmitting a contact card.

40. An apparatus for identifying an object associated with a nearby Internet of Things (IoT) device, comprising:
a transceiver; and
at least one processor configured to:
receive identifying information associated with the nearby IoT device;
detect a nearby object in a field of view of a camera application;
determine whether or not the nearby object is associated with the nearby IoT device based on the received identifying information matching information associated with the nearby object detected by the camera application in the field of view of the camera application; and
correlate, based on the nearby object being associated with the nearby IoT device, the nearby object with information associated with the object associated with the nearby IoT device.

41. The apparatus of claim 40, wherein the at least one processor is further configured to:
create an indication to identify the object associated with the nearby IoT device.

42. The apparatus of claim 41, wherein the at least one processor being configured to create comprises the at least one processor being configured to:
cause the transceiver to transmit a beacon signal to one or more nearby IoT devices, the one or more nearby IoT devices including the nearby IoT device.

43. The apparatus of claim 40, wherein the information associated with the nearby object comprises a beacon signal.

44. The apparatus of claim 43, wherein the beacon signal comprises a sound beacon or a light beacon, and wherein the received identifying information comprises an indication of a type of the beacon signal and a frequency or color of the beacon signal.

45. The apparatus of claim 40, wherein the identifying information comprises temperature information of the object associated with the nearby IoT device, and wherein the at least one processor being configured to determine whether or not the nearby object is associated with the nearby IoT device comprises the at least one processor being configured to:
determine a temperature of the nearby object; and
determine whether or not the temperature information is within a threshold of the temperature of the nearby object,
wherein the at least one processor being configured to correlate comprises the at least one processor being configured to determine that the nearby object corresponds to the object associated with the nearby IoT device based on the temperature information being within the threshold of the temperature of the nearby object.

46. The apparatus of claim 45, wherein the temperature of the nearby object is determined based on a position of the nearby IoT device relative to the nearby object.

47. The apparatus of claim 40, wherein the identifying information comprises pattern information of the nearby IoT device, and wherein the at least one processor being configured to determine whether or not the nearby object is associated with the nearby IoT device comprises the at least one processor being configured to:
determine a pattern of the nearby IoT device; and
determine whether or not the pattern information matches the pattern of the nearby IoT device,
wherein the at least one processor being configured to correlate comprises the at least one processor being configured to determine that the nearby object corresponds to the object associated with the nearby IoT device based on the pattern information matching the pattern of the nearby IoT device.

48. The apparatus of claim 40, wherein the identifying information comprises a spatial orientation of the nearby IoT device, and wherein the at least one processor being configured to determine whether or not the nearby object is associated with the nearby IoT device comprises the at least one processor being configured to:
determine a spatial orientation of the nearby object; and
determine whether or not the spatial orientation of the nearby IoT device matches the spatial orientation of the nearby object,
wherein the at least one processor being configured to correlate comprises the at least one processor being configured to determine that the nearby object corresponds to the object associated with the nearby IoT device based on the spatial orientation of the nearby IoT device matches the spatial orientation of the nearby object.

49. The apparatus of claim 48, wherein the spatial orientation of the nearby object is determined based on a position of the nearby IoT device relative to the nearby object and/or gravity.

50. The apparatus of claim 40, wherein the identifying information is received out-of-band.

51. The apparatus of claim 40, further comprising:
logic configured to receive the information associated with the object associated with the nearby IoT device.

52. The apparatus of claim 51, wherein the at least one processor being configured to correlate comprises the at least one processor being configured to tag the nearby object with the information associated with the object in a picture or video of the object associated with the nearby IoT device.

53. The apparatus of claim 51, wherein the object associated with the nearby IoT device is a human, and wherein the received identifying information comprises contact information of the human.

54. The apparatus of claim 40, wherein the object associated with the nearby IoT device comprises the nearby IoT device.

55. The apparatus of claim 40, wherein the at least one processor is further configured to:
ignore the identifying information associated with the nearby IoT device based on the nearby object not being associated with the nearby IoT device.

56. The apparatus of claim 40, wherein the at least one processor is further configured to:
cause the transceiver to receive identifying information associated with a second nearby IoT device, wherein the second nearby IoT device is associated with a second nearby object that is not in a field of view of the camera application; and
ignore the identifying information associated with the second nearby IoT device.

57. The apparatus of claim 56, wherein the camera application determines that the second nearby object is not in the field of view of the camera application based on no detection of a match between the identifying information associated with the second nearby IoT device and any nearby object detected in the field of view of the camera application.

58. The apparatus of claim 40, wherein the camera application comprises a camera application of a user equipment.

59. The apparatus of claim 58, wherein the nearby IoT device comprises an IoT device within peer-to-peer wireless communications range of the user equipment.

60. The apparatus of claim 40, wherein the at least one processor being configured to receive comprises the at least one processor being configured to receive a plurality of types of subject metadata associated with each of a plurality of nearby IoT devices associated with a plurality of objects, the plurality of objects including the object associated with the nearby IoT device, and wherein the plurality of types of subject metadata are the same for each of the plurality of nearby IoT devices.

61. The apparatus of claim 60, wherein the at least one processor is further configured to:
   determine a variance of each of the plurality of types of subject metadata across the plurality of nearby IoT devices;
   rank each of the plurality of types of subject metadata based on the determined variance; and
   generate weightings of a plurality of subject identification methods corresponding to the plurality of types of subject metadata based on the ranking.

62. The apparatus of claim 61, wherein a highest ranking is assigned to a type of subject metadata of the plurality of types of subject metadata with a highest variance.

63. The apparatus of claim 62, wherein a highest weighting is assigned to a type of subject metadata of the plurality of types of subject metadata with the highest ranking.

64. The apparatus of claim 61, wherein the at least one processor is further configured to:
   identify the plurality of objects using a subject identification method with a highest weighting.

65. The apparatus of claim 61, wherein the at least one processor is further configured to:
   cause the transceiver to transmit the generated weightings to the plurality of nearby IoT devices and/or a server in communication with the plurality of nearby IoT devices.

66. The apparatus of claim 65, wherein the transceiver is configured to:
   receive weightings of the plurality of subject identification methods from the plurality of nearby IoT devices and/or the server in communication with the plurality of nearby IoT devices, wherein the camera application incorporates the received weightings into the generated weightings.

67. The apparatus of claim 60, wherein the plurality of types of subject metadata comprise two or more of a sound beacon, a light beacon, a heat signature, pattern information, and/or pose information associated with the plurality of objects.

68. The apparatus of claim 61, wherein each of the plurality of subject identification methods is useable to identify the plurality of objects using a corresponding one of the plurality of types of subject metadata.

69. The apparatus of claim 60, wherein the transceiver is configured to:
   transmit the plurality of types of subject metadata associated with each of the plurality of nearby IoT devices to a server,
   wherein the server determines a variance of each of the plurality of types of subject metadata across the plurality of nearby IoT devices, ranks each of the plurality of types of subject metadata based on the determined variance, and generates weightings of a plurality of subject identification methods corresponding to the plurality of types of subject metadata based on the ranking.

70. The apparatus of claim 69, wherein the transceiver is configured to:
   receive the weightings of the plurality of subject identification methods from the server.

71. The apparatus of claim 69, wherein the server receives subject metadata from other IoT devices, and wherein the server generates the weightings of the plurality of subject identification methods based additionally on the subject metadata received from the other IoT devices.

72. The apparatus of claim 40, wherein the at least one processor is further configured to:
   cause the transceiver to transmit a beacon signal to one or more IoT devices in a field of view of the camera application.

73. The apparatus of claim 72, wherein the beacon signal is transmitted to the one or more IoT devices in the field of view of the camera application using directional speakers.

74. The apparatus of claim 72, wherein the transceiver is configured to:
   transmit a discovery message to the one or more IoT devices, the discovery message including filtering criteria; and
   receive a beacon signal from each of a subset of the one or more IoT devices, wherein each IoT device of the subset of the one or more IoT devices has attributes that match the filtering criteria.

75. The apparatus of claim 74, wherein the at least one processor is further configured to:
   receive the filtering criteria, wherein the filtering criteria is user defined and defines attribute values of the one or more IoT devices in the field of view of the camera application that should respond to the discovery message.

76. The apparatus of claim 74, wherein each of the one or more IoT devices in the field of view of the camera application determines whether or not it has attribute values that match the filtering criteria.

77. The apparatus of claim 76, wherein devices of the one or more IoT devices in the field of view of the camera application determine that they do not have attribute values that match the filtering criteria, and in response, do not respond to the received beacon signal or the discovery message.

78. The apparatus of claim 76, wherein each of the subset of the one or more IoT devices in the field of view of the camera application determine that it has attribute values that match the filtering criteria, and in response, responds to the discovery message by emitting a beacon signal and transmitting a contact card.

79. An apparatus for identifying an object associated with a nearby Internet of Things (IoT) device, comprising:
   means for receiving identifying information associated with the nearby IoT device;
   means for detecting a nearby object in a field of view of a camera application;
   means for determining whether or not the nearby object is associated with the nearby IoT device based on the received identifying information matching information associated with the nearby object detected by the camera application in the field of view of the camera application; and
   means for correlating the nearby object with information associated with the object associated with the nearby IoT device based on the nearby object being associated with the nearby IoT device.

80. A non-transitory computer-readable medium for identifying an object associated with a nearby Internet of Things (IoT) device, comprising:
- at least one instruction to receive identifying information associated with the nearby IoT device;
- at least one instruction to detect a nearby object in a field of view of a camera application;
- at least one instruction to determine whether or not the nearby object is associated with the nearby IoT device based on the received identifying information matching information associated with the nearby object detected by the camera application in the field of view of the camera application; and
- at least one instruction to correlate the nearby object with information associated with the object associated with the nearby IoT device based on the nearby object being associated with the nearby IoT device.

* * * * *